(12) United States Patent
Masi et al.

(10) Patent No.: US 6,831,034 B2
(45) Date of Patent: Dec. 14, 2004

(54) CATALYTIC COMPOSITION FOR THE (CO) POLYMERIZATION OF α-OLEFINS

(75) Inventors: Francesco Masi, Sant'Angelo Lodigiano (IT); Anna Sommazzi, Santa Margherita Ligure (IT); Roberto Santi, Novara (IT)

(73) Assignee: Polimeri Europa S.p.A., Brindisi (IT)

( * ) Notice: Subject to any disclaimer, the term of this patent is extended or adjusted under 35 U.S.C. 154(b) by 0 days.

(21) Appl. No.: 10/670,211

(22) Filed: Sep. 26, 2003

(65) Prior Publication Data

US 2004/0127657 A1 Jul. 1, 2004

(30) Foreign Application Priority Data

Sep. 27, 2002 (IT) ..................................... MI2002A2054

(51) Int. Cl.⁷ .................................................. C08F 4/64
(52) U.S. Cl. ...................... 502/152; 526/131; 526/135; 526/160; 526/943; 503/103
(58) Field of Search ................ 502/152, 103; 526/131, 135, 160, 168, 943

(56) References Cited

U.S. PATENT DOCUMENTS 6,184,316 B1   2/2001   Masi et al.

FOREIGN PATENT DOCUMENTS

| EP | 0 801 079   | 10/1997 |
| EP | 1 013 675   | 6/2000  |
| WO | WO 95/00526 | 1/1995  |

OTHER PUBLICATIONS

Chemical Abstracts, vol. 131, No. 3, p. 596, XP–002238485, JP 11–165075, Jun. 22, 1999.
L. Yong, et al., Journal of Molecular Catalysis A: Chemical, vol. 184, No. 1–2, XP–001150381, pp. 147–150, "Organotitanium Chemistry: Substituent Effects on the Dimerization of Isoprene Catalyzed by Alkenyl–Substituted Cyclopentadientyl Titanium Complexes", 2002.
X. Tao, et al., Journal of Molecular Catalysis A: Chemical, vol. 156, No. 1–2, XP–001150379, pp. 121–126, "Substituent Effect on Oligomerization of Isoprene Catalized by Ring–Substituted $(RCp)_2TiCl_2/i-C_3H_7MgCl$ System", 2000.
E.–I. Negishi, et al., Tetrahedron Letters, vol. 25, No. 32, XP–001148892, pp. 3407–3410, "Reaction of Alkenes and Dienes with T–Butylmagnesium Halides and Zirconocene Dihalides. A Convenient Procedure for Hydrozirconation and a novel T–Butylzirconation of Conjugated Alkenes", 1984.

*Primary Examiner*—Caixia Lu
(74) *Attorney, Agent, or Firm*—Oblon, Spivak, McClelland, Maier & Neustadt, P.C.

(57) ABSTRACT

Catalytic composition for the (co)polymerization of ethylene and other α-olefins, including a metallocene complex of a metal M of group 4 of the periodic table or the product obtainable from the same combined with a suitable activator, wherein said metallocene complex includes at least one cyclopentadienyl group and at least one unsaturated hydrocarbyl organic group bonded to the metal M, having the following formula (I):

$$-(A_xD_yU_z)R' \qquad (I)$$

wherein:

A represents any monomeric unit deriving from a vinylaromatic group polymerizable by means of anionic polymerization, having from 6 to 20 carbon atoms;

D represents any monomeric unit deriving from a conjugated diolefin polymerizable by means of anionic polymerization, having from 4 to 20 carbon atoms;

U represents any generic optional monomeric unit deriving from an unsaturated compound co-polymerizable with any of the above conjugated diolefins D or vinylaromatic compounds A;

$R'$ represents hydrogen or a hydrocarbyl group having from 1 to 20 carbon atoms, each index "x" and "y" can be independently zero or an integer, provided the sum (x+y) is equal to or higher than 2, preferably between 2 and 50, more preferably between 2 and 25;

"z" can be zero or an integer ranging from 1 to 20.

52 Claims, No Drawings

CATALYTIC COMPOSITION FOR THE (CO) POLYMERIZATION OF α-OLEFINS

BACKGROUND OF THE INVENTION

The present invention relates to a catalytic composition for the (co)polymerization of α-olefins.

More specifically, the present invention relates to a catalytic composition based on metallocene complexes which include stabilizing hydrocarbyl groups, and a (co) polymerization process of α-olefins in the presence of said composition.

It is generally known in the art that catalysts with a high activity and selectivity in the polymerization of α-olefins can be obtained by combining an organic oxyderivative of aluminum (in particular, polymeric methylaluminoxane or MAO) with an $\eta^5$-cyclopentadienyl compound (metallocene) of a transition metal of group four of the periodic table of elements (in the form approved by IUPAC and published by "CRC Press Inc." in 1989). There have been numerous publications on the preparation and use of said metallocenes since the eighties; among the first, reference can be made to the description of H. Sinn, W. Kaminsky, in Adv. Organomet. Chem., vol. 18 (1980), page 99 and U.S. Pat. No. 4,542,199.

More recently, catalysts of the metallocene type have been developed, capable of polymerizing olefins also in the absence of organo-oxygenated compounds of aluminum and, in any case, such as to include a lower quantity of metals in the polyolefins thus obtained. Said catalytic systems are normally based on the formation of a catalytic species of a cationic nature, obtained by the contact of a suitable metallocene with an activator consisting of a strong Lewis acid or, more advantageously, an organometallic salt whose anion has a delocalized charge and is slightly coordinative, usually a fluorinated tetra aryl borane. Several cationic systems of this type are described, for example, in the publications of R. R. Jordan in "Advances in Organometallic Chemistry", vol. 32 (1990), pages 325–387, and of X. Yang et al. in "Journal of America Chemical Society", vol. 116 (1994), page 10015, where numerous patent references on the matter, are quoted, together with a wide general survey in the field.

Other cationic systems based on metallocene and fluoro aryl aluminates are described in international patent application WO 98/0715, disclosing an enhanced catalytic activity. These catalysts, however, are relatively complex to prepare and are particularly unstable to air and humidity, analogously to those containing boron anions; moreover, they cannot be easily adapted to non-alkylated metallocene complexes.

More recently, the presence of an active catalytic species of the cationic type has also been assumed in polymerization catalysis based on metallocenes and aluminoxanes.

One of the unresolved drawbacks of metallocene catalysts of the ionic type, is the relative complexity of the process for their production, as well as various problems relating to their stability, both for their preservation before use and in relation to the duration of the active species during the polymerization process. It is well known, in fact, that these ionic catalysts can be obtained by the direct reaction of an alkyl-metallocene, such as, for example, dimethyl bis-indenyl zirconium, with a suitable salt including a boron anion with a delocalized charge and a cation capable of extracting an alkyl group bonded to the metallocene and forming a neutral and stable molecule. The use of alkyl metallocenes, however, causes serious problems relating to the preservation and stability of these compounds, and consequently the possibility is known of equally obtaining ionic metallocenes also starting from the respective chlorides, but using an alkyl aluminum to form, in situ, an intermediate alkyl metallocene. This latter method, however, does not allow full utilization of the metallocene compound, which is partially deactivated, and also requires the use of high quantities of metal in the co-catalyst, with a consequent deterioration in the dielectric properties and compatibility with food of the polymeric or hydrogenated products obtained in the presence of said catalysts.

The production of metallocene catalysts for the polymerization of olefins therefore seems to still have significant drawbacks, in spite of the remarkable progress made with respect to the traditional Ziegler-Natta polymerization, and there seem to be considerable margins for further improvement to meet the increasingly refined demands of industry and the market.

Japanese patent application No. 11-165075 describes certain metallocene complexes of a metal of group 4 comprising two styril or oligostyril groups bonded to the metal. Such complexes are used for the catalytic hydrogenation of olefins.

Studies on the structure and synthesis of bis-cyclopentadienyl-allyl complexes of metals of group 4 of the periodic table have been reported in literature, in the publication J. Organomet. Chem., vol. 14, 149–156, (1968) page 150. In this study, a significant instability of said allyl complexes with time, is observed.

Subsequently, Italian patent application nr. MI00A02776, of the Applicant, describes allyl-metallocene complexes of group 4, showing a significantly improved stability and performance reproducibility. The allyl-metallocene complexes described therein, however, also need particular attention during their synthesis and do not have a completely satisfactory versatility in the formation of the desired catalysts.

In the continuous attempt to satisfy the above demands with the development of innovative processes and materials, the Applicant has now found a new group of metallocene complexes with stabilizing hydrocarbyl groups in the molecule, which surprisingly allow catalytic systems to be obtained, which are stable enough to allow their transportation and storage for prolonged periods of time and which are also suitable for the formation of metallocene catalysts with a high activity and stability, combined both with ionizing co-catalysts and with aluminoxanes and other analogous activators.

SUMMARY OF THE INVENTION

A first object of the present invention therefore relates to, and is claimed as such, a catalytic composition for the (co)-polymerization of ethylene and other α-olefins, i.e. the homo-polymerization of ethylene and other α-olefins, the copolymerization of ethylene with one or more other monomers copolymerizable therewith, such as, for example, α-olefins, conjugated or non-conjugated diolefins, styrene and its derivatives, etc., the co-polymerization of α-olefins with each other or with other monomers copolymerizable therewith. Said catalytic composition includes a particular metallocene complex, as specified hereunder or the product obtained from the combination (i.e. contact and reaction) of the same with an activator (co-catalyst) selected from those known in the art of metallocene polymerization catalysis, particularly an organic compound of a metal M" selected from boron, aluminum, gallium and tin, or a fluorinated derivative of a cyclopentadienyl compound, or a combination of said compounds.

In particular, said catalytic composition includes, according to the present invention, the following two components in contact with each other, or the product of their reaction:

(i) a metallocene complex of a metal M of group 4 of the periodic table, including at least one $\eta^5$-cyclopentadienyl group and at least one unsaturated hydrocarbyl organic group R', bonded to the metal M;

(ii) an ionizing activator consisting of at least one organic or organometallic compound capable of reacting with said metallocene complex (i) so as to form a positive ionic charge thereon by the extraction of an anion of an unsaturated hydrocarbylic organic group and formation of a non-coordinating anion with a delocalized ionic charge, characterized in that said unsaturated hydrocarbyl group R' has the following formula (I):

$$-(A_x D_y U_z)R' \qquad (I)$$

wherein:

A represents any monomeric unit deriving from a vinylaromatic group polymerizable by means of anionic polymerization, having from 6 to 20 carbon atoms;

D represents any monomeric unit deriving from a conjugated diolefin polymerizable by means of anionic polymerization, having from 4 to 20 carbon atoms;

U represents any generic optional monomeric unit deriving from an unsaturated compound co-polymerizable with any of the above conjugated diolefins D or vinylaromatic compounds A;

$R'$ represents hydrogen or a hydrocarbyl group having from 1 to 20 carbon atoms, each index "x" and "y" can be independently zero or an integer, provided the sum (x+y) is equal to or higher than 2, preferably between 2 and 50, even more preferably between 2 and 25;

"z" can be zero or an integer ranging from 1 to 20.

Said ionizing activators forming component (ii) are normally known in the art and can be divided into four main groups: I) oxygenated organometallic compounds of the metals of groups 13 and 14 of the periodic table, II) non-coordinating ionic organometallic compounds, III) non-coordinating Lewis acids and IV) poly-fluorinated cyclopentadienyl or cyclohexadienyl compounds. Compounds of the type II), III) and particularly IV) are preferred.

A second object of the invention relates to a process for the (co)polymerization of ethylene or α-olefins, characterized in that it is carried out in the presence of said catalytic composition.

Possible further objects of the present invention will appear evident from the following description and examples.

DETAILED DESCRIPTION

The term "(co)polymerization of α-olefins" as used in the text and claims, refers to both the homo- and copolymerization of α-olefins with each other or with a different ethylenically unsaturated compound, polymerizable with these, under the above process conditions.

The term "suitable", as used in the text and claims, with reference to groups, radicals and substituents in the formulae of organic and organometallic compounds, means that said groups, radicals and substituents are compatible with the stability characteristics of said compounds in the pure state, i.e. substantially inert with respect to any part of the molecule under examination, on the basis of the characteristics of chemical reactivity generally known to average technical experts in the field.

The term "derivative", as used herein with reference to monomeric units, means the attainment of said units in accordance with one of the known anionic poly-addition reactions, with both a 1–2 and, when possible, 1–4 mechanism. The monomeric units thus obtained essentially have the same structure as the monomer from which they derive, but with one unsaturation less, and are bonded by a covalent bond to both ends of the oligomeric chain.

The metallocene complex (i) in the catalytic composition, according to the present invention, is a complex belonging to a new category of metallocene compounds of group 4 of the periodic table, i.e. titanium, zirconium and hafnium, and is characterized by an enhanced stability in solution or in the pure state, and by a specific reactivity during the formation of catalytic compositions suitable for promoting (co)-polymerization processes of α-olefins and hydrogenation processes of olefinically unsaturated compounds. Without limiting in any way the present invention to any particular theory or interpretation, we believe that the advantageous and surprising characteristics of said complexes with respect to the mono- or bi-metallocene complexes of the known art, can be attributed to the presence of at least one unsaturated group having formula (I), bonded to the metal M.

Preferably, said metallocene complex (i) is represented by the following formula (II):

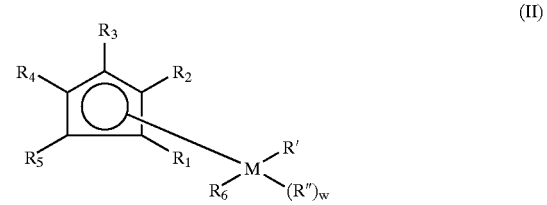

wherein:

M is a metal selected from titanium, zirconium and hafnium, preferably from titanium and zirconium, bonded, by means of a coordinative bond, to a first $\eta^5$-cyclopentadienyl group;

R" represents an optional group bonded to the metal M, consisting of an organic or inorganic radical of an anionic nature, different from cyclopentadienyl or substituted cyclopentadienyl;

the groups $R_1$, $R_2$, $R_3$, $R_4$, $R_5$, each independently represent, an atom or a radical bonded to said first $\eta^5$-cyclopentadienyl group, selected from hydrogen or any other suitable organic or inorganic substituent of said cyclopentadienyl group;

$R_6$ represents any other suitable organic or inorganic group of an anionic nature, bonded to the metal M;

"w" has the value of 0 or 1, according to whether the R" group is absent or present in formula (II).

In accordance with the previous definition of the complex having formula (II), the metal M can be selected from titanium, zirconium and hafnium, preferably from titanium and zirconium. In particular, according to a certain aspect of the present invention, the compounds having formula (II), wherein the metal M is Ti or Zr, more preferably Zr, in oxidation state +4 and "w" is 1, are preferred, without in any way excluding the use, in said processes, of catalysts obtained from compounds with M in oxidation state +3. It has also been found that mixtures of two or more complexes having formula (II) can be advantageous for particular uses in the field of (co)polymerization, possibly comprising two or even three different metals M, with the same or different oxidation state, such as, for example, Ti(III) and Hf(IV) or Zr(IV) and Hf(IV), which are anyhow included in the scope of the present invention.

In accordance with the widest sense of the present invention, the group R', schematically represented with the above formula (I), is an unsaturated group consisting of several monomeric units of the A and/or D, and possibly U type, as specified above, without any limitation of formula or chain sequence. In this sense, said formula (I) must be interpreted in the most general meaning of the empirical formula of said oligomeric group, with no limitation in the formula and in the chain sequence. In this sense, said formula (I) should be interpreted in the most general meaning of the empirical formula of said oligomeric group, with no limitations in the sequences of said monomeric units or groups of monomeric units. Moreover, as said oligomeric groups having formula (I) can be obtained through anionic polymerization under controlled conditions, said formula (I) must be necessarily interpreted, according to common practice, as being representative of a mixture of compounds deriving from a polymerization process and consequently having a varying number of units, distributed around an average value which represents the average polymerization degree. The unsaturations can be of the olefin type, as in the D monomeric units deriving from a diene, or of the aromatic type, as in the A units deriving from a vinylaromatic compound.

Oligomeric groups having formula (I), in accordance with the present invention, can consist of a single block of two or more D units in a sequence, resulting from a single conjugated diolefin, possibly partially polymerized with a 1–4 mechanism and partially with a 1–2 mechanism, according to what is known from the anionic polymerization technique, or from a single block of two or more A units in a sequence, resulting from a single vinylaromatic compound.

Oligomeric groups consisting of at least two monomeric units A or at least two monomeric units D, different from each other, deriving from two or more conjugated diolefins or two or more vinylaromatic compounds, are also included in formula (I).

Oligomeric groups consisting of at least one monomeric unit D deriving from a conjugated diolefin, at least one monomeric unit A deriving from a vinylaromatic compound and possibly at least one co-polymerizable unit U, are also included in formula (I). Said oligomeric groups can have a statistical distribution of the different monomeric units, or can consist of more or less homogeneous blocks of units A or D or U, bonded to each other.

According to a particular aspect of the present invention, said formula (I) represents a block oligomer, preferably di-block, wherein a first block can be distinguished, made up of D units alone, bonded to each other, said first block, in turn, being bonded to a second block essentially consisting of A units alone. Through particular methods, known in the anionic co-polymerization technique for obtaining elastomers, it is also possible to obtain three-block structures, one of A units alone, one of D units alone and the third consisting of A and D units in statistical sequence (called "tapered" according to the known art). The sequence with which the blocks are bonded to each other and to the metal M and to the group $R^I$, respectively, at the chain ends, can be easily selected by an average expert, on the basis of the polymerization techniques available, as can be seen hereunder. The block D is preferably bonded to the metal M.

Typical diolefins polymerizable via anionic polymerization to form monomeric units of the D type, are 1,3-diolefins having from 4 to 20, preferably from 4 to 10 carbon atoms, such as, for example, 1,3-butadiene, isoprene, chloroprene, 2,3-dimethyl-1,3-butadiene, 1,3-pentadiene, 2-methyl-1,3-pentadiene, 1,3-hexadiene, 4,5-diethyl-1,3-octadiene, 3-butyl-1,3-octadiene, or certain cyclo-diolefins, such as, for example, 1,3-cyclohexadiene.

Typical vinyl aromatic compounds polymerizable through anionic polymerization to form monomeric units of the A type, are compounds wherein one group of an aromatic nature (also hetero-aromatic) is bonded in α position to a vinyl group, i.e. a primary olefin group, for example styrene, 4-tert-butyl styrene, α-methyl styrene, o-methyl styrene, p-methyl styrene, vinyl naphthalene, 2-vinyl furan and 2-vinyl pyridine. Preferred vinyl aromatic compounds are hydrocarbyl compounds with 8 to 15 carbon atoms, particularly styrene.

Acrylic and methacrylic esters, such as methyl methacrylate, ethyl methacrylate, acrylonitrile, methyl acrylate, t-butyl acrylate, methyl-2-ethyl acrylate, methyl-2-phenylacrylate are, for example, typical compounds polymerizable with the previous ones, suitable for forming monomeric units of the U type.

Particularly preferred R' groups are those wherein the sum of the indexes (x+y+z) is between 2 and 15. According to a particular aspect, "z" is equal to 0 and (x+y) is between 2 and 15. According another particular aspect, "x" and "z" are both equal to 0 and said R' group consists of an oligomer of a conjugated diene D with an average polymerization degree ranging from 2 to 15. According to a further preferred aspect of the present invention, "x" is 0 or an integer higher than zero and y is an integer higher than zero.

The $R^I$ group in formula (I) preferably represents an aliphatic, cycloaliphatic, aromatic or alkyl aromatic group having from 1 to 20, preferably from 2 to 10, more preferably from 3 to 6, carbon atoms and derives from the organic residue of the polymerization initiator in the preparation process of said oligomeric group of formula (I). Typical, non-limiting meanings of the group $R^I$ are, for example, tert-butyl, n-butyl, isopropyl, n-hexyl, cyclohexyl, benzyl, phenyl, toluyl.

The R" group in formula (II) can have any of the general or specific meanings normally attributed to it in the field of technical literature, with reference to a non-cyclopentadienyl substituent of the metal M in a metallocene complex. It can therefore be inorganic or organic, of a more or less anionic nature, according to the relative electro negativity of its atoms. A second end of this group can also be bonded to the group $R_6$ in formula (II), to form, in the complex, a cyclic structure including the metal M, such as, for example, in the case of a divalent tetramethylene —(CH$_2$)$_4$— group, or the group 1,4-tetramethylene-dioxide —O—(CH$_2$)$_4$—O—.

Non-limiting examples of groups of substituents which can be represented, in this case, by R" are: hydrogen, halogen such as chlorine or bromine, an alkyl or alkyl aryl $C_1$–$C_{20}$, group, an allyl $C_3$–$C_{20}$ group, an alkyl silyl $C_3$–$C_{20}$, group, a cycloalkyl $C_5$–$C_{20}$, group, an aryl or aryl alkyl $C_6$–$C_{20}$, group, an alkoxide or thioalkoxide $C_1$–$C_{20}$, group, a carboxylate or carbamate $C_2$–$C_{20}$, group, a dialkyl amide $C_2$–$C_{20}$ group and an alkyl silylamide $C_4$–$C_{20}$ group. Typical examples are hydride, halide, especially chloride or bromide, a linear or branched alkyl group such as methyl, ethyl, isopropyl, isoamyl, octyl, decyl, benzyl, an alkyl silyl group such as, for example, trimethyl silyl, triethyl silyl or tributyl silyl, a cycloalkyl group such as cyclopentyl, cyclohexyl, 4-methyl cyclohexyl, an aryl group such as phenyl or toluyl, an alkoxyl or thioalkoxyl group such as methoxyl, ethoxyl, iso- or sec-butoxyl, ethyl sulfide, a carboxylate group such as acetate, trifluoro acetate, propionate, butyrate, pivalate, stearate, benzoate or, again, a dialkyl amide group such as diethyl amide, dibutyl amide, or alkylsilyl amide such as bis(trimethyl silyl)amide or ethyl trimethyl silylamide. Among the above, hydrogen and alkyl, alkyl amide and alkyl silyl organic groups having from 1 to 20 carbon atoms are preferred.

According to a particularly preferred aspect of the present invention, both R' and R" groups are, independently, oligomeric groups of formula (I). Metallocene complexes of this type have a particularly high stability, but also maintain excellent activities when used as catalyst components. The two groups R' and R" can represent two different groups of formula (I) bonded to the same metal M, or, even more preferably, can substantially have the same formula as they have been obtained through the same anionic polymerization process. When necessary, said complexes can also include the two groups R' and R" having the same terminal group $R^I$ in common, so as to form a cyclic structure with the metal M. Complexes of this type can be obtained starting from a living dianionic group, as specified in greater detail hereunder.

Each of said atoms or radicals $R_1$, $R_2$, $R_3$, $R_4$, $R_5$, bonded to a first $\eta^5$-cyclopentadienyl group in the complex of formula (II), can independently be hydrogen, halogen or any hydrocarbyl group having from 1 to 20, preferably from 1 to 10, carbon atoms, substituted, when necessary, with suitable hetero-atoms such as, for example, Si, Ge, O, F, Cl or Br. Typical, non-limiting, examples of these radicals are: hydrogen, methyl, ethyl, propyl, isopropyl, butyl, sec-butyl, isobutyl, tert-butyl, hexyl, 2-ethyl butyl, octyl, decyl, dodecyl, hexadecyl, octadecyl, cyclohexyl, methyl cyclohexyl, ethyl cyclohexyl, 2,4,6-trimethyl cyclohexyl, octyl cyclohexyl, phenyl, methyl-phenyl, ethylphenyl, biphenyl, 2,4,6-trimethyl phenyl, octyl-phenyl, benzyl, 4-methyl benzyl, biphenyl methyl, trifluoro-methyl, perfluoro-ethyl, pentafluoro-phenyl, 3,4,5-trifluorophenyl, dichloro-phenyl, chlorofluoro-phenyl, trichloromethyl, 2-methoxy-ethyl, 2-trifluoro-methoxyethyl, 4-methoxy-phenyl and 4-ethoxy-phenyl, trimethyl silyl, triethyl silyl.

Moreover, analogously to what is already known in technical literature in relation to other cyclopentadienyl complexes of metals of group 4 of the periodic table, two or even more of said radicals having suitable structures, can be bonded to each other to give a cyclic, or even polycyclic, saturated, unsaturated or aromatic structure, having at least one common bond "condensed"(according to the term normally used) with said cyclopentadienyl ring. In accordance with the present invention, the indenyl and fluorenyl groups, possibly further substituted, and the corresponding groups obtained by the hydrogenation of their aromatic rings, are non-limiting examples of said condensed cyclic structures.

Furthermore, according to the present invention, any radical or condensed group bonded to said first $\eta^5$-cyclopentadienyl group, can, in turn, be covalently bonded to said group $R_6$ to form a cyclic structure, called "bridged", according to the wording currently used in the field, which includes also said metal M in the cycle.

Typical, non-limiting examples of said first cyclopentadienyl group in formula (II) are: cyclopentadienyl, 1,2,3-trimethyl cyclopentadienyl, 1,2,4-trimethyl cyclopentadienyl, pentamethyl cyclopentadienyl, indenyl, fluorenyl, 4,5,6,7-tetrahydroindenyl, 1,3-dimethyl-4,5,6,7-tetrahydroindenyl, 1,2,3-trimethyl indenyl, octahydrofluorenyl, the benzo-cycloalkyl pentadienyl groups described in Italian patent application Nr. MI00A000680.

Said $R_6$ group of formula (II), according to the present invention, represents, in its most general form, any organic or inorganic group bonded to the metal M, of a more or less anionic nature, according to the relative electro-negativity of its atoms, analogously with the usual definition of a generic ligand of the metal in a metallocene complex. $R_6$ can have, for example, any of the previously mentioned meanings for the R" group. It can be hydrogen, a halogen or an alkyl, cycloalkyl, aryl, alkoxy, aryloxy, amide or carboxy group, having from 1 to 30, preferably from 1 to 20, carbon atoms. A second chain-end of $R_6$ can also be joined to the group R", or preferably to said first cyclopentadienyl group in formula (II), to form an overall cyclic structure including the metal M, as, for example, in the case of a divalent tetramethylene —$(CH_2)_4$— group, or the group 1,4-tetramethylenedioxide —O—$(CH_2)_4$—O—, 1,2-ethylenebis-$\eta^5$-cyclopentadienyl groups.

Non-limiting examples of substituent groups which can be represented, in this case, by $R_6$ are, hydride, halide such as chloride or bromide, an alkyl or alkylaryl $C_1$–$C_{20}$ group, an allyl $C_3$–$C_{20}$ group, an alkylsilyl $C_3$–$C_{20}$ group, a cycloalkyl $C_5$–$C_{20}$ group, an aryl or arylalkyl $C_6$–$C_{20}$ group, an alkoxide or thioalkoxide $C_1$–$C_{20}$ group, a carboxylate or carbamate $C_2$–$C_{20}$ group, a dialkylamide $C_2$–$C_{20}$ group and an alkylsilylamide $C_4$–$C_{20}$ group. Typical examples are: hydride, methyl chloride, ethyl, butyl, isopropyl, isoamyl, octyl, decyl, benzyl, trimethyl silyl, triethyl silyl or tributyl silyl, cyclopentyl, cyclohexyl, 4-methylcyclohexyl, phenyl or toluyl, methoxyl, ethoxyl, iso- or sec-butoxyl, ethyl sulfide, acetate, trifluoro acetate, propionate, butyrate, pivalate, stearate, benzoate, diethyl amide, dibutyl amide, bis(trimethyl silyl)amide or ethyl trimethyl silylamide. Among the above-mentioned products, hydrogen and alkyl, alkyl amide and alkyl silyl organic groups having from 1 to 20 carbon atoms, are preferred.

According to a particular, preferred aspect of the present invention, said $R_6$ includes a second cyclopentadienyl group, $\eta^5$-coordinated to the metal M, and can also be optionally bonded, by means of a covalent bond, to any non-monovalent atom of said first cyclopentadienyl group, preferably in substitution of the group $R_1$, to form, as mentioned above, a bridged cyclic structure including the same metal M. In particular, said $R_6$ group can have the following formula (III):

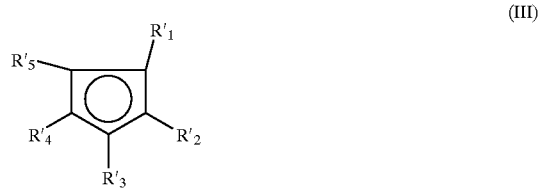

(III)

wherein each of the different $R'_1$, $R'_2$, $R'_3$, $R'_4$, $R'_5$, groups is independently selected from any of the different meanings previously mentioned with reference to the $R_1$, $R_2$, $R_3$, $R_4$, $R_5$ groups of said first cyclopentadienyl group. When said group of formula (III) is bonded to said first cyclopentadienyl group to form a so-called "bridged" cyclic structure, said $R_1$ and $R'_1$ groups preferably form together a divalent group having 1 to 20, preferably 2 to 15 carbon atoms and possibly also containing atoms selected from silicon, germanium and halogens, particularly fluorine. Typical, non-limiting examples of said divalent groups are methylene, 1,2-ethylene, 1,3-propylene, 1,4-butylene, 1,4-but-2-enylene, dimethyl silylene, diethyl silylene, 1,2-tetramethyldisilylene, 1,2-xilylene, 1,3-xilylene, 1,2-phenylenemethylene, dimethyl germylene, 1,3-cyclohexylene.

Non-limiting examples of the groups $R'_1, R'_2, R'_3, R'_4, R'_5$, are hydrogen, methyl, ethyl, propyl, isopropyl, butyl, sec-butyl, isobutyl, tert-butyl, hexyl, 2-ethyl butyl, octyl, decyl, dodecyl, hexadecyl, octadecyl, cyclohexyl, methyl cyclohexyl, ethyl cyclohexyl, 2,4,6-trimethyl cyclohexyl, octyl cyclohexyl, phenyl, methyl-phenyl, ethylphenyl, biphenyl, 2,4,6-trimethyl phenyl, octyl-phenyl, benzyl, 4-methyl benzyl, biphenyl methyl, trifluoro-methyl, perfluoro-ethyl, pentafluoro-phenyl, 3,4,5-trifluorophenyl, dichloro-phenyl, chlorofluoro-phenyl, trichloromethyl, 2-methoxy-ethyl, 2-trifluoro-methoxyethyl, 4-methoxy-phenyl and 4-ethoxy-phenyl, trimethyl silyl, triethyl silyl.

According to another aspect of the present invention, $R_6$ represents an organic group bonded to the metal M by means of an atom selected from N, P, O or S, for example, any amido group having the formula $R_7R_8N$—, phosphido group having the formula $R_7R_8P$—, oxy group having the formula $R_7O$—, thio group of formula $R_7S$—, wherein said $R_7$ and $R_8$ groups can have any of the meanings specified above for any of the groups $R'_1, R'_2, R'_3, R'_4$ or $R'_5$. Among these, those groups wherein $R_7$ is a divalent group, preferably having from 1 to 5 carbon atoms, bridged also to said cyclopentadienyl group in formula (II), in substitution of $R_1$, have proved to be of particular interest.

Complexes having formula (II) wherein said first and second cyclopentadienyl group are the same, are particularly preferred, according to the present invention, due to the simplicity of their preparation. Among these, bis(tetrahydroindenyl) complexes, optionally alkyl-substituted on the cyclopentadienyl ring, or bonded to each other by means of a divalent "bridged" group, according to the above description, have been found to be even more advantageous, for the purposes of the present invention.

According to a further particular aspect of the present invention, said $R_6$ group can represent another oligomeric group having formula (I), to form a metallocene complex which comprises said first cyclopentadienyl group and two or three oligomeric groups having formula (I), respectively, depending on whether the metal M has oxidation state (III) or (IV).

Also included in the scope of the present invention, is the use, as component (i) of the above catalytic composition, of any mixture or composition comprising at least one of the above complexes having formula (II) and, in particular, any mixture of two or more of said complexes having formula (II).

Metallocene polynuclear compounds consisting of two or more metallocene compounds, each of which has a structure corresponding to a compound included in the above formula (II), joined to each other by means of one or more covalent bonds between two or more groups bonded to each metal, are not excluded from the scope of this invention, even though they are not explicitly represented by formula (II), as they are obvious equivalents of the same.

Complexes having formula (II) comprising one or more neutral coordinating compounds, normally called Lewis bases, intentionally not represented in formula (II) solely for the sake of descriptive simplification, are also not excluded from the scope of the present invention. Said Lewis bases, as is well known, can form stable adducts, which can be isolated in pure form, or a coordination sphere in solution, with complexes showing a coordinative deficiency, such as those in accordance with the present invention.

The complexes according to the present invention can be prepared according to the methods and processes typical of organometallic chemistry. In particular, they can be prepared by means of a process which includes the reaction of a suitable organometallic compound with a suitable metallocene precursor, according to the procedure of a nucleophilic substitution reaction, as described, for example, in the publication "Comprehensive Organometallic Chemistry", Pergamon Press Ltd., vol. 3, pages 331–426, 560–599 (1982), whose contents should be considered as being fully incorporated herein as reference.

According to said process, with particular reference to the metallocene complex having formula (II), a metallocene precursor having the following formula (IV):

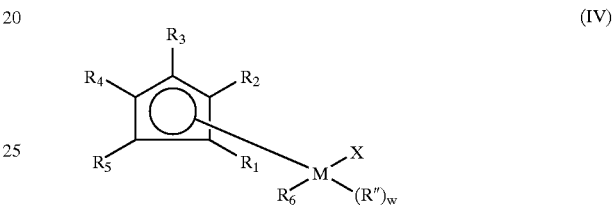

(IV)

wherein:
the different symbols M, R", $R_1$, $R_2$, $R_3$, $R_4$, $R_5$, $R_6$, and "w" can have any of the preferred or specific general meanings mentioned for the corresponding symbols in formula (II), and X represents a suitable outgoing anionic group in a nucleophilic substitution reaction on the metal M;

is put in contact and reacted, in the suitable proportions, with an organometallic compound having the following formula (V):

$$M'T_t[(A_xD_yU_z)R']$$ (V)

wherein:
the different symbols A, D, U, $R^I$, "x", "y" and "z" can have any of the preferred or specific general meanings mentioned for the corresponding symbols in formula (I), and M' is a metal selected from metals of groups 1 or 2 of the periodic table of elements, T is any suitable organic or inorganic anion, or another group having the formula $(A_xD_yU_z)R^I$, "t" has the value of 0 when M' is a metal of group 1, and the value of 1 when M' is a metal of group 2 of the periodic table.

until the desired compound having formula (II) is obtained.

Said process is suitably carried out under relatively mild conditions, typical of organometallic reactions, preferably in the presence of a suitable inert solvent and at temperatures ranging from −60 to +100° C., more preferably from −20 to +40° C. The reaction is normally very rapid and is completed in times preferably ranging from 5 minutes to 2 hours, in relation to the other reaction parameters. Solvents suitable for the purpose are generally substances which do not react with the reagents used, and are liquid at the reaction temperature. Hydrocarbon solvents, such as cyclohexane, hexane, heptane, toluene, ethyl benzene are typical solvents of this type.

The precursor having formula (IV) and the organometallic compound having formula (V) are put in contact with each other with atomic ratios M'/M generally around the stoichiometric value of the reaction, i.e., for instance, 1/1, 2/1 or 3/1, depending on whether a complex comprising 1, 2 or 3 unsaturated oligomeric groups having formula (I), respectively, is to be obtained. This value can also be a decimal number between 1 and 3, if a product consisting of a mixture of complexes with a different number of oligomeric substituents, is required at the end. For example, if an equimolecular mixture of two complexes of bis(indenyl) zirconium, with one or two oligomeric substituents, respectively, is desired, the precursor bis(indenyl)ZrCl$_2$, for example, is reacted with the oligomeric salt, for instance Li(isoprene)$_6$Bu$^t$, with a salt/complex molar ratio of about 1.5, to obtain a mixture of complexes which can be schematically represented by the empirical formula bis(indenyl) Zr[(isoprene)$_6$]$_{1.5}$Cl$_{1.5}$.

In the case of the ratios 2/1 and 3/1, the structure of the precursor is more suitably selected so that 2 or 3 outgoing groups are respectively available on the metal M. A slight excess, up to 15% in moles, of organometallic compound (V), can favour the completion of the desired reaction.

The contact conditions of said two reagents are not particularly critical and can be chosen by experts in the field on the basis of the technical notes used in organometallic chemistry for effecting substitution reactions on complexes. Preferably, a solution of the compound having formula (V) is slowly added, under vigorous stirring, to a solution or suspension of the precursor having formula (IV). In general, it is always preferable to operate in such a way as to avoid the formation of local excesses of one of the two reagents.

In accordance with the above, said precursor having formula (IV) consists of a metallocene compound in which at least one X group is a good outgoing group in the presence of an organometallic compound with strong anionic characteristics and a high nucleophilic nature, such as the compound having formula (V), which belongs to the group of metalloalkyls. X is generally a group capable of forming an anion with a low nucleophilic property. It can typically be a halide, such as chloride or bromide, an alkylsilyl $C_3$–$C_{20}$ group, an alkoxide or thioalkoxide $C_1$–$C_{20}$ group, a carboxylate or carbamate $C_2$–$C_{20}$ group, a dialkylamide $C_2$–$C_{20}$ group and a alkylsilylamide $C_4$–$C_{20}$ group. Typical examples are chloride or bromide, trimethyl silyl, triethyl silyl or tributyl silyl, methoxyl, ethoxyl, iso- or sec-butoxyl, ethyl sulfide, acetate, trifluoro-acetate, propionate, butyrate, pivalate, stearate, benzoate, diethyl amide, dibutyl amide, bis(trimethyl silyl)amide or ethyl trimethyl silylamide. Among the above products, the chloride group is preferred.

The other groups and substituents of the precursor having formula (IV), are correspondingly selected by technical experts in the field on the basis of the structure of the metallocene complex having formula (II) which is to be obtained. If a metallocene complex, with two or three unsaturated oligomeric groups having formula (I), the same as each other, is to be obtained, the precursor having formula (IV) can be conveniently selected from the complexes in which the groups R$_6$ and R" also consist of one of the above good outgoing groups, as defined for the meaning of group X. In this case, R$_6$ and R" are preferably both chloride.

According to another version of the present process, it is also possible to prepare complexes having formula (II) with 2 or 3, preferably 2, unsaturated oligomeric groups having a different structure. For this purpose, the process is carried out in two or even three different steps, by reacting, in any step, a different organometallic compound having formula (V).

In some cases, when M is titanium, it has been observed that the organometallic compound (V) can have a reducing effect (through β-elimination) on the precursor having formula (IV), especially if used in excess with respect to the stoichiometric value, allowing a Ti(III) complex to be obtained, also starting from a precursor containing Ti(IV) and operating at relatively high temperatures, normally higher than 10° C. The Ti(III) complex itself has been obtained starting from the corresponding precursor containing Ti(III). At temperatures lower than 10° C., on the contrary, and, more generally, with more stabilized titanium metallocene precursors, such as, for example, those containing two indenyl or pentamethyl cyclopentadienyl groups, it is possible to obtain complexes of titanium (IV) having formula (II) with two oligomeric groups. For an illustration of the different behaviour of titanium as a function of the reaction temperature, reference should be made to the following examples 8 and 9.

The metallocene precursor having formula (IV) can normally be prepared by means of one of the suitable methods, known in the art, for the synthesis of metallocene complexes of metals of group 4. These methods and their numerous variations are widely described in literature easily available to technical experts in the field, for instance in the above-mentioned "Comprehensive Organometallic Chemistry". Many Ti and Zr metallocene precursors, in which X and R" in formula (IV) represent chloride or methyl, are commercially available products.

The organometallic compound having formula (V) consists of an unsaturated hydrocarbyl metal wherein said anionic group [(A$_x$D$_y$U$_z$)R$^I$] corresponds to said oligomeric group having formula (I). The metal M' can be an alkaline metal, such as lithium, sodium, potassium, or earth-alkaline such as magnesium or calcium. Lithium and sodium are preferred. If M' belongs to group 2, it is preferably magnesium and the complex having formula (V) comprises a second counter-anion T which preferably consists of an inorganic anion, especially a hydride or a halide, for example chloride or bromide, or it can be a second oligomeric hydrocarbyl group [(A$_x$D$_y$U$_z$)R$^I$].

The organometallic compound having formula (V) is generally used, in practice, in the form of a solution in a hydrocarbon solvent, as obtained from the synthesis process, without isolating it as a pure compound. It is preferably prepared by means of one of the known living anionic polymerization techniques. Some of the very numerous publications on this matter are listed below, for illustrative purposes:

H. I. Hsieh, R. P. Quirk, Anionic Polymerization, Dekker Ed. (1996)
M. Morton, Anionic Polymerization: Principles and Practice, Academic Press, 1983
J. Mulvaney et alii, Advances in Polymer Science, 3 106 (1961)
W. Gebert at alii, Die Makromolekulare Chemie, 144, 97 (1971)
M. Morton et alii, J. Polym. Sci.: Part C, 1, 311 (1963)
M. Morton et alii, J. Polym. Sci.: Part A, 1, 1735 (1963)
F. M. Brower et alii, J. Polym. Sci.: Part A, 1, 1749 (1963)
A. Guyot et alii, J. Macromol. Sci.-Chem. A4(1) 107 (1970)

According to a preferred technique, the desired amount of polymerizable monomer is progressively added, under stirring, to a solution of a suitable initiator. The reaction proceeds with the typical so-called living anionic polymerization mechanism, as the anionic chain-end of the polymeric chain remains active during the reaction time and allows further amounts of monomer to be incorporated, even different from the initial monomer, if this is added to the reaction mixture. Oligomers made up of different monomeric blocks, or with a statistical distribution or consisting of blocks separated by sections of chains with a statistical distribution (tapered), can thus be formed. At the end, contrary to what is normally in use in the preparation of oligomers and polymers with this technique, the living polymer chain, forming said organometallic compound having formula (V), is not blocked, but is reacted as such with the metallocene precursor having formula (IV).

Said preparation is normally carried out according to the known technique, at temperatures between −80 and +80° C., preferably −30 and +20° C., in hydrocarbon solvents, possibly containing small amounts of aprotic polar compounds, such as tetrahydrofuran, to obtain particular distributions of the monomeric units in the chain.

Compounds having the formula $M'T_tR^I$ are suitable anionic polymerization initiators, wherein the meaning of M', T, "t" and $R^I$ is as specified above. Examples of groups of these compounds are lithium alkyls, lithium aryls, sodium alkyls, magnesium alkyl-halides (Grignard compounds). In some cases, still included in the present invention, the $R^I$ group can be a dianionic group bonded to two atoms of the metal M'. The use of these dianionic groups as initiators allows divalent oligomeric groups to be obtained, which, as already mentioned, are bonded to the metal M in the complex having formula (II), forming a cyclic structure including the same metal or, if reacted in the presence of a higher concentration of the metallocene precursor, can form binuclear complexes. According to a known technique, the initiator can also be obtained by the reaction of a suitable unsaturated monomer, for example styrene or isoprene, with an alkaline metal, such as sodium or potassium. Also in this case dianionic initiators are formed.

Organic compounds of lithium, such as, for example, n-propyl lithium, isopropyl lithium, n-butyl lithium, sec-butyl lithium, tert-butyl lithium, n-pentyl lithium, benzyl lithium, 1,4-dilithium-n-butane, 1,5-dilithium pentane, 1,2-dilithium biphenyl ethane, are preferably used as initiators.

According to another technique, said organometallic compound having formula (V) can also be prepared by the metallation of an unsaturated oligomer conveniently prepared by means of any of the suitable polymerization or copolymerization techniques of conjugated dienes, vinylaromatic compounds and possibly other co-polymerizable monomers mentioned above. Said techniques can be of the radicalic type, of the catalytic type, for example by means of the well-known Ziegler-Natta catalysts, including metallocene catalysts, or of the anionic type. The oligomers (sometimes, also with a relatively long chain) thus obtained are reacted with a suitable metallizing agent, such as, for example, an alkaline metal or an alkyl compound of a metal of group 1 or 2 of the periodic table, to obtain the desired organometallic compound of formula (V).

The complexes having formula (II), in accordance with the present invention, are surprisingly stable over a long period of time, also at room temperatures or higher. This solves evident problems relating to preservation for long periods of time, which, on the other hand, create a serious drawback in the preparation and use of the catalytic compositions based on the metallocenes, particularly alkyl complexes, known in the art.

A further advantage consists in the possibility of regulating the chain length of the oligomeric groups having formula (I) to the desired value, in said complexes having formula (II). It is therefore possible to obtain catalytic compositions whose components are selected so as to have an optimal solubility in certain solvents, such as hydrocarbons, especially aliphatic hydrocarbons, due to the presence of an oligomeric group with a relatively long chain having lipophilic characteristics.

With reference to said component (ii) in the catalytic composition according to the present invention, this consists of any ionizing activator capable of forming a positive ionic charge (cationic) on the metallocene complex of formula (II). Ionizing activators of this type are known in the art and belong to various groups of compounds having very different formulae, which makes it impossible to define them through a single general formula. They substantially include all activators currently known as being capable of forming a catalytic composition for the polymerization of olefins, combined with any metallocene complex of a metal of group 4 of the periodic table.

Non-limiting examples of said activators are those belonging to the following groups: I) oxygenated polynuclear organometallic compounds of a metal selected from those of groups 13 or 14 of the periodic table; II) ionic organometallic compounds whose anion has a de-localized and non-coordinating negative charge; III) non-coordinating strong Lewis acids and IV) polyfluorinated cyclopentadienyl compounds. The compounds of group II), III) and particularly IV), are preferred.

Organo-oxygenated oligomeric or polymeric derivatives of aluminum, gallium or tin, are compounds of type I), according to the present invention. At least two atoms of a metal selected from Al, Ga and Sn are present in said compounds, each bonded to at least one oxygen atom and to at least one hydrocarbyl group, preferably an alkyl group having from 1 to 6 carbon atoms, preferably methyl.

According to this aspect of the invention, component (ii) is more preferably a polymeric aluminoxane. As is known, aluminoxanes are compounds containing Al—O—Al bonds, with a varying O/Al molar ratio, preferably between 1.8 and 2.1, which can be obtained by reaction, under controlled conditions, of an aluminum alkyl, preferably an aluminum trialkyl, with water or other compounds containing predetermined amounts of available water, such as, for example, in the case of the reaction of trimethyl aluminum with aluminum sulfate hexahydrate, copper sulfate pentahydrate or iron sulfate pentahydrate. The aluminoxanes preferably used for the formation of the polymerization catalyst of the present invention are cyclic and/or linear oligo- or polymeric compounds, characterized by the presence of repetitive units having the following formula (VI):

(VI)

wherein $R_7$ is a $C_1$–$C_6$ alkyl group, preferably methyl.

Each molecule of aluminoxane preferably contains from 4 to 70 repetitive units which can also not be all the same, but contain different $R_7$ groups.

The aluminoxanes, when used for the formation of a polymerization catalytic composition according to the present invention, are put in contact with said metallocene complex (i), preferably included in formula (II), in such proportions that the atomic ratio between Al and the metal M is within the range from 10 to 10,000 and preferably from 100 to 5,000. The sequence with which the metallocene complex in component (i) and the aluminoxane are put in contact with each other, is not particularly critical.

According to the present invention, in addition to the above aluminoxanes, galloxanes (in which gallium is present instead of aluminium, in the previous formulae) are also included in the definition of component (ii) together with stannoxanes, whose use as polymerization co-catalysts of olefins in the presence of metallocene complexes is known, for instance, from the patents U.S. Pat. Nos. 5,128,295 and 5,258,475.

Ionic organometallic compounds of a metal M" selected from boron, aluminum or gallium, preferably boron, are compounds of type II) which can be used as activators, according to the present invention. They consist of a cation capable of reacting with the complex of formula (II) extracting therefrom an unsaturated oligomeric group of formula (I) to form one or more stable and non-reactive compounds, preferably neutral, and a non-coordinating organic anion containing the metal M", whose negative charge is, at least partially delocalized on a multicentric structure.

Components (ii) suitable as ionizing systems of the above type II), are preferably selected from the voluminous organometallic compounds of boron and aluminum, such as, for example, those represented by the following general formulae:

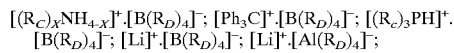

wherein the subscript "x" is an integer between 0 and 3, each $R_C$ group independently represents an alkyl or aryl radical with from 1 to 10 carbon atoms, and each RD group independently represents a partially or, preferably, a totally fluorinated aryl radical having from 6 to 20 carbon atoms.

Said compounds of type II) are normally used in such quantities that the ratio between the atom M" in component (ii) and the atom M in the metallocene complex of formula (II) is included within the range of 0.1 to 15, preferably from 0.5 to 10, even more preferably from 1 to 6.

Compounds of type III) are strong Lewis acids, such as aryl-derivatives of boron and aluminum, preferably fluorinated on the aromatic rings, such as, for example, tris (pentafluorophenyl)boron. Said compounds of type III), according to the present invention, when used in stoichiometric amounts or with a slight excess, react with the metallocene of formula (II) extracting an allyl anion and forming, on the one hand, the desired metallocene cation and, on the other, a voluminous non-coordinating anion with delocalization of the negative charge.

Examples of ionizing compounds of type II) or III), which can be used as component (ii) in the catalytic compositions according to the present invention, are widely described in the art, combined with the different metallocene complexes, such as, for example, in the following patent publications, whose contents are incorporated herein as reference:

European patent applications, published with the nr.: EP-A 277,003, EP-A 277,004, EP-A 522,581, EP-A 495,375, EP-A 520,732, EP-A 478,913, EP-A 468,651, EPA 427,697, EP-A 421,659, EP-A 418,044;

international patents published with the nr.: WO 92/00333, WO 92/05208, WO 91/09882.

U.S. Pat. No. 5,064,802, U.S. Pat. No. 2,827,446, U.S. Pat. No. 5,066,739.

Activator compounds of type IV) which can be used for the purposes of the present invention comprise certain fluorinated organic compounds, including at least one di-unsaturated cycle with 5 or 6 carbon atoms, having the following formula (VII):

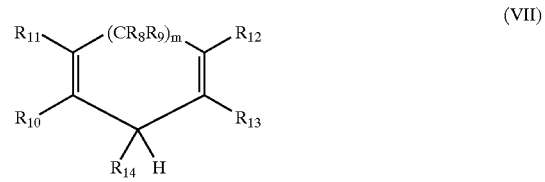

wherein:
each $R_i$ (where "i" is an integer from 10 to 14), $R_8$ and $R_9$ group is a substituent of the di-unsaturated cycle independently selected from hydrogen, fluorine and an aliphatic or aromatic hydrocarbyl group, fluorinated or non-fluorinated, having from 1 to 20 carbon atoms, optionally bonded to a different hydrocarbyl $R_i$ group adjacent thereto, to form a further condensed cycle with said di-unsaturated cycle, on the condition that at least three, preferably at least four, of the $R_8$, $R_9$, $R_{10}$, $R_{11}$, $R_{12}$, or $R_{13}$, groups, are independently selected, from the group consisting of:

fluorine, or a fluorinated alkyl group having the formula —CF($R'_1R'_2$), or a fluorinated aryl group $Ar_F$, substituted on the aromatic ring, with at least two groups selected from fluorine, a —CF($R'_1R'_2$) group as defined above, or a different $Ar_F$ group, or a fluorinated vinyl group $V_F$, substituted on at least two positions of the double bond with groups selected from fluorine, a —CF($R'_1R'_2$) group or an $Ar_F$ group, as defined above;

wherein each $R'_1$ or $R'_2$ can have any of the above meanings of the $R_i$ groups, and at least one of them is fluorine or fluorinated alkyl at least in position 1, or a fluorinated aryl $Ar_F$ as defined below, or a fluorinated vinyl group $V_F$ as defined below; and "m" can have the value of 1 or 0, and, more specifically, is 1 when said —$CR_8R_9$— group is present and said di-unsaturated cycle includes 6 carbon atoms, whereas it is 0 in the preferred case wherein said —$CR_8R_9$— group is substituted by a covalent bond and said di-unsaturated cycle includes 5 carbon atoms.

The fluorinated fluorenyl compounds included in the previous formula (VII), having the following formula (VIII),

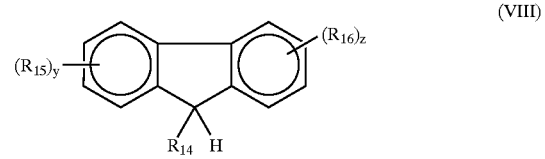

are particularly preferred as activators of type IV):
wherein:
$R_{14}$ has the same meaning defined for the compounds of formula (VII);
(y) is an integer from 1 to 4;
(z) is an integer from 1 to 4;
the groups $R_{15}$ and $R_{16}$ are, if necessary, independently substituents of each hydrogen atom of the respective aromatic ring in one or more of the four positions available, and are selected from fluorine or an aliphatic or aromatic hydrocarbyl group, fluorinated or non-fluorinated, having from 1 to 20 carbon atoms, optionally Joined to a different $R_{15}$ or, $R_{16}$ hydrocarbyl group, respectively, to form a further cycle, on the condition that at least 3, preferably at least 4 of said $R_4$, $R_{15}$ and $R_{16}$ groups are independently selected from the group consisting of:

fluorine, or a fluorinated alkyl group having the formula —CF($R'_1R'_2$), wherein each $R'_1$ or $R'_2$ group can have any of the above meanings of the $R_i$ groups and at least one of these is fluorine, or fluorinated alkyl at least in position 1, or a fluorinated alkyl $Ar_F$ as defined below, or a fluorinated vinyl group $V_F$ as defined below, or a fluorinated aryl group $Ar_F$, substituted on the aromatic ring, with at least two groups selected from fluorine, a —CF($R'_1R'_2$) group as defined above, or a different $Ar_F$ group, or a fluorinated vinyl group $V_F$, substituted on at least two positions of the double bond with groups selected from fluorine, a —CF($R'_1R'_2$) group or an $Ar_F$ group, as defined above.

In a preferred embodiment, in the compounds of formula (VIII) all eight $R_{15}$ and $R_{16}$ groups are the same and are trifluoromethyl, or even more preferably fluorine.

The above compounds of formula (VII) and those more preferred of formula (VIII), together with the relative preparation methods and their use as ionizing activators in catalytic compositions for the polymerization of α-olefins, are widely described in European patent application published with the number 1,013,675, whose contents are fully incorporated herein as reference.

According to the invention, the above activators consisting of compounds of type IV) are advantageously added to the catalytic composition in a molar ratio ranging from 1 to 10, preferably from 1.1 to 5, with respect to the moles of metallocene complex of formula (II).

It has also been found that particularly advantageous catalytic compositions according to the present invention can be obtained using, as ionizing activator, a compound of the above type IV) combined with a suitable quantity, preferably in a molar ratio of 1 to 10 with respect to the compound of type IV), of an organometallic compound sufficiently basic to react with the acid hydrogen of the above compound of formula (VII) or (VIII) in an acid/base reaction. These organometallic compounds are, for example, metallo-hydrocarbyls or halogen-hydrocarbyls, preferably metallo-alkyls, of metals of groups 1, 2 or 13 of the periodic table, preferably lithium, magnesium or aluminum.

Even more preferably, the above combination also comprises a polar aprotic organic compound, not containing metallic atoms, having a dielectric constant, in the pure state, equal to or greater than 2, and a weakly coordinating capacity corresponding to a DN donicity not greater than 15 kcal/moles, and preferably ranging from 1.0 to 10 kcal/moles, according to what is specifically described in international patent application Nr. PCT/EP02/007684, whose contents are fully incorporated herein as reference.

The formation of the catalytic composition according to the present invention is generally carried out in an inert liquid medium, preferably hydrocarbon, by contact of the two essential components (i) and (ii). The selection of components (i) and (ii) which are preferably combined with each other, as also the particular procedure used, can vary according to the molecular structures and result desired, analogously to what is widely described in specific literature available to experts in the art. A particular advantage of the catalytic compositions of the present invention, however, lies in the excellent activity obtained in cases wherein the activator (ii) is of the type II), III) or IV) and the composition has a minimum or zero content of aluminum alkyls or other metallo-alkyls of groups 1 or 2 of the periodic table.

Non-limiting examples of combinations of components (i) and (ii) in accordance with the catalytic compositions of the present invention are listed hereunder in Table 1 in which each line illustrates the combination of a metallocene compound with an activator.

TABLE 1

| Metallocene complex (i) | Ionising activator (ii) |
|---|---|
| $Cp_2Zr[((D_{C5H8})_3A_{C8H8})_3Pr^i]_2$ | 1,2,3,4,5,6,7,8-octafluoro-9-(pentafluoro phenyl)fluorene |
| $Cp_2Zr[((D_{C5H8})_3A_{C8H8})_3Pr^i]_2$ | $B(C_6F_5)_4CPh_3$ |
| $Cp_2ZrCl[(A_{C8H8})_3Bu^t]$ | methyl alumoxane |
| $Cp_2ZrCl[((D_{C5H8})_3A_{C8H8})_5Pr^i]$ | 1,2,3,4,5,6,7,8-octafluoro-fluorene |
| $CP_2ZrCl[(A_{C8H8})_{10}Pr^i]$ | $B(C_6F_5)_3$ |
| $Cp_2ZrCl[((D_{C5H8})_3A_{C8H8})_{10}Pr^i]$ | 1,2,3,4,5,6,7,8-octafluoro-9-hydroxy-9-(pentafluoro phenyl)fluorene |
| $Cp_2Zr[(D_{C5H8})_{20}Bu^t]_2$ | 1,2,3,4,5,6,7,8-octafluoro-9-(pentafluoro phenyl)fluorene |
| $[o\text{-Xen-}(CP)_2]Zr[(D_{C5H8})_4Bu^t]_2$ | 9,9'-bis(9H-fluorene 1,1',2 ,2',3,3',4,4',-5,5',6,6',7,7',8,8'hexadecafluoro) |
| $[o\text{-Xen-}(Cp)_2]Zr[(B_{C4H6})_5Bu^t]_2$ | 1,2,3,4,5,6,7,8-octafluoro-9-(pentafluoro phenyl)fluorene |
| $Cp_2ZrCl[(B_{C4H6})_3Pr^i]$ | $B(C_6F_5)_4CPh_3$ |
| $Cp_2Zr[((D_{C5H8})_3A_{C8H8})_3Pr^i]_2$ | methyl alumoxane |
| $[Ph_2Si(\eta^5\text{-Ind})_2]Zr[(D_{C5H8})_3Pr^i]_2$ | 1,2,3,4,5,6,7,8-octafluoro-9-(pentafluoro phenyl)fluorene |
| $[Ph_2Si(\eta^5\text{-Ind})_2]Zr[(D_{C5H8})_3Pr^i]_2$ | $B(C_6F_5)_4NHPh(Me)_2$ |
| $Ph_2Si(\eta^5\text{-Ind})_2Zr[(A_{C8H8})_8Bu^t]_2$ | $B(C_6F_5)_4NHPh(Me)_2$ |
| $[o\text{-Xen-}(\eta^5\text{-}(THInd)_2]Ti[(D_{C5H8})_{15}Bu^t]$ | $Al(C_6F_5)_3$ |
| $(\eta^5Ind)Ti[(D_{C5H8})_5Bu^t]$ | 1,2,3,4,5,6,7,8-octafluoro-9-(pentafluoro phenyl)fluorene |
| $[o\text{-Xen-}(\eta^5\text{-}(THInd)_2]ZrCl[(D_{C5H8})_9Bu^t]$ | $B(C_6F_5)_4NHPh(Me)_2$ |
| $Cp_2Zr[(D_{C5H8})_3Pr^i]_2$ | 1,2,3,4,5,6,7,8-octafluoro-9-(pentafluoro phenyl)fluorene |

TABLE 1-continued

| Metallocene complex (i) | Ionising activator (ii) |
| --- | --- |
| o-Bzn-[1-(-$\eta^5$-THInd)$_2$Zr[(D$_{C5H8}$)$_5$Bu$^t$]$_2$ | methyl alumoxane |
| o-Bnz-[$\eta^5$-C$_5$Me$_4$]$_2$Zr[(D$_{C5H8}$)$_5$Bu$^t$]$_2$ | B(C$_6$F$_5$)$_4$NHPh(Me)$_2$ |
| [1,2-en($\eta^5$-Ind)$_2$]Zr[(D$_{C5H8}$)$_3$Pr$^i$]$_2$ | AlMe$_3$/(Et$_3$Sn)$_2$° |
| 1,2-en($\eta^5$-Ind)$_2$]Zr[(A$_{C8H8}$)$_3$Pr$^i$]$_2$ | 1,2,3,4,5,6,7,8-octafluoro-9-hydroxy-9-(pentafluoro phenyl)fluorene |
| [1,2-en($\eta^5$-Ind)$_2$]ZrCl[(D$_{C5H8}$)$_3$Bu$^t$] | methyl alumoxane |
| [1,2-en($\eta^5$-Ind)$_2$]ZrCl[(A$_{C8H8}$)$_3$Bu$^t$] | 1,2,3,4,5,6,7,8-octafluoro-9-(pentafluoro phenyl)fluorene |
| $\eta^5$-(THInd)$_2$ZrCl[(D$_{C5H8}$)$_5$Pr$^i$] | 1,2,3,4,5,6,7,8-octafluoro-9-(pentafluoro phenyl)fluorene |
| $\eta^5$-(Ind)$_2$Zr[(D$_{C5H8}$)$_7$Bu$^n$]$_2$ | 1,2,3,4,5,6,7,8-octafluoro-9-hydroxy-9-(pentafluoro phenyl)fluorene |
| (Cp)$_2$Ti[(D$_{C5H8}$)$_5$Pr$^i$] | 1,2,3,4,5,6,7,8-octafluoro-9-(pentafluoro phenyl)fluorene |
| Me$_2$Si($\eta^5$-C$_5$Me$_4$)(Nbu$^t$)]Ti[(D$_{C5H8}$)$_{10}$Pr$^i$]$_2$ | B(C$_6$F$_5$)$_4$NHPh(Me)$_2$ |
| [Me$_2$Si($\eta^5$-C$_5$Me$_4$)(Nbu$^t$)]Ti[(D$_{C5H8}$)$_{10}$Pr$^i$] | 1,2,3,4,5,6,7,8-octafluoro-9-(pentafluoro phenyl)fluorene |
| (Cp)$_2$Ti[(B$_{C4H6}$)$_7$Pr$^i$] | 1,2,3,4,5,6,7,8-octafluoro-9-(pentafluoro phenyl)fluorene |
| [1,2-en($\eta^5$-Ind)$_2$]Ti[(D$_{C5H8}$)$_5$Pr$^i$] | 1,2,3,4,5,6,7,8-octafluoro-9-(pentafluoro phenyl)fluorene |
| ($\eta^5$-C$_5$Me$_5$)$_3$Ti[(B$_{C4H6}$)$_7$Pr$^i$] | B(C$_6$F$_5$)$_4$NHPh(Me)$_2$ |
| [$\eta^5$-(2,4-CF$_3$)$_2$Bz)C$_5$H$_4$]$_2$ZrCl[(D$_{C5H8}$)$_3$Bu$^t$] | B(C$_6$F$_5$)$_4$NHPh(Me)$_2$ |
| Cp$_2$Zr[(A$_{C8H8}$)$_3$Pr$^i$]$_2$ | B(C$_6$F$_5$)$_4$NHPh(Me)$_2$ |
| o-Bzn-[$\eta^5$-1-(3-Me)Ind]$_2$Hf[(D$_{C5H8}$)$_5$Bu$^t$]$_2$ | B(C$_6$F$_5$)$_4$NHPh(Me)$_2$ |
| Me$_2$Si($\eta^5$-C$_5$H$_4$)$_2$]Hf[(D$_{C5H8}$)$_5$BU$^t$]$_2$ | B(C$_6$F$_5$)$_4$CPh$_3$ |
| [Pro$^i$(Cp)($\eta^5$-Flu)]Zr[(D$_{C5H8}$)$_{15}$Bu$^t$]$_2$ | B(C$_6$F$_5$)$_4$CPh$_3$ |
| ($\eta^5$-Ind)Zr[(D$_{C5H8}$)$_3$Pr$^i$]$_3$ | 1,2,3,4,5,6,7,8-octafluoro-9-(pentafluoro phenyl)fluorene |
| o-Bzn-[$\eta^5$-1-(4,7-Me$_2$)Ind]$_2$Ti[(D$_{C5H8}$)$_3$Pr$^i$] | 1,2,3,4,5,6,7,8-octafluoro-9-hydroxy-9-(pentafluoro phenyl) fluorene |
| [Pro$^i$(Cp)($\eta^5$-Flu)]Zr[(D$_{C5H8}$)$_{10}$Pr$^i$]$_2$ | AlMe$_3$/(Et$_3$Sn)$_2$° |
| ($\eta^5$-C$_5$Me$_5$)$_2$Zr[(A$_{C8H8}$)$_{10}$Pr$^i$]$_3$ | methyl alumoxane |
| [1,2-en($\eta^5$-THInd)$_2$]Zr[((D$_{C5H8}$)$_3$A$_{C8H8}$)$_3$Pr$^i$]$_2$ | B(C$_6$F$_5$)$_4$CPh$_3$ |
| CP$_2$Zr[((D$_{C5H8}$)$_3$A$_{C8H8}$)$_{10}$Pr$^i$]$_2$ | 1,2,3,4,5,6,7,8-octafluoro-9-(pentafluoro phenyl)fluorene |
| [$\eta^5$-(4-F-Ph)C$_5$H$_4$]$_2$Zr[(B$_{C4H6}$)$_5$Bu$^t$]$_2$ | methyl alumoxane |
| ($\eta^5$-Ind)Ti[(B$_{C4H6}$)$_7$Pr$^i$]$_3$ | B(C$_6$F$_5$)$_3$ |
| [Me$_2$Si(CH$_2$-$\eta^5$-C$_5$H$_4$)$_2$]Zr[(D$_{C5H8}$)$_8$BU$^t$]$_2$ | B(C$_6$F$_5$)$_4$NHPh(Me) |
| ($\eta^5$-C$_5$Me$_5$)Ti[(D$_{C5H8}$)$_5$Bu$^t$]$_3$ | 1,2,3,4,5,6,7,8-octafluoro-fluorene |
| Cp$_2$ZrCl[(D$_{C5H8}$)$_{10}$Pr$^i$] | Al(C$_6$F$_5$)$_3$ |
| [$\eta^5$-(2,4-CF$_3$)$_2$Bz)C$_5$H$_4$]$_2$Zr[(B$_{C4H6}$)$_{10}$Bu$^t$]$_2$ | 1,2,3,4,5,6,7,8-octafluoro-9-(pentafluoro phenyl)fluorene |
| [o-Xen-(Cp)($\eta^5$-Flu)]Zr[(D$_{C5H8}$)$_5$Bu$^t$]$_2$ | B(C$_6$F$_5$)$_4$CPh$_3$ |
| Cp$_2$ZrCl[(A$_{C8H8}$)$_3$Pr$^i$] | 1,2,3,4,5,6,7,8-octafluoro-fluorene |
| [Me$_2$Si(CH$_2$)$_2$-($\eta^5$-Ph-C$_5$H$_3$)$_2$]Zr[(B$_{C4H6}$)$_5$Bu$^t$]$_2$ | 1,2,3,4,5,6,7,8-octafluoro-9-hydroxy-9-(pentafluoro phenyl)fluorene |
| Cp$_2$ZrCl[(B$_{C4H6}$)$_3$Pr$^i$] | 9,9'-bis(9H-fluorene 1,1',2,2',3,3',4,4',-5,5',6,6',7,7'8,8' hexadeca-fluorine |
| o-Bzn-[$\eta^5$-1-(5,6-Me$_2$)Ind]$_2$Zr[(B$_{C4H6}$)$_{10}$Bu$^t$]$_2$ | B(C$_6$F$_5$)$_4$CPh$_3$ |
| Cp$_2$Zr[(B$_{C4H6}$)$_5$Pr$^i$]$_2$ | B(C$_6$F$_5$)$_4$CPh$_3$ |
| o-Bzn-[$\eta^5$-1-(4,7-Me$_2$)Ind]$_2$Zr[(B$_{C5H6}$)$_5$Bu$^t$]$_2$ | B(C$_6$F$_5$)$_4$CPh$_3$ |
| Cp$_2$Zr[(B$_{C4H6}$)$_5$Bu$^t$]$_2$ | 1,2,3,4,5,6,7,8-octafluoro-fluorene |
| [Me$_2$Si($\eta^5$-1-Ind)$_2$]Hf[((D$_{C5H8}$)$_3$A$_{C8H8}$)$_3$Pr$^i$]$_2$ | B(C$_6$F$_5$)$_4$CPh$_3$ |
| Cp$_2$Zr[(A$_{C8H8}$)$_{10}$Pr$^i$]$_2$ | B(C$_6$F$_5$)$_4$NHPh(Me) |
| [Me$_2$Si($\eta^5$-THInd)$_2$]Hf[((D$_{C5H8}$)$_3$A$_{C8H8}$)$_3$Ph]$_2$ | 1,2,3,4,5,6,7,8-octafluoro-9-(pentafluoro phenyl)fluorene |
| Cp$_2$Zr[(D$_{C5H8}$)$_3$Bu$^n$]$_2$ | 1,2,3,4,5,6,7,8-octafluoro-fluorene |
| [1,2-en($\eta^5$-Ind)$_2$]Ti[(D$_{C5H8}$)$_5$Bu$^t$] | B(C$_6$F$_5$)$_3$ |
| [$\eta^5$-1,3-(CF$_3$)$_2$C$_5$H$_3$]Ti[(D$_{C5H8}$)$_5$Bu$^t$]$_2$ | methyl alumoxane |
| ($\eta^5$-THInd)$_2$Zr[(D$_{C5H8}$)$_5$Pr$^i$]$_2$ | Al(C$_6$F$_5$)$_3$ |
| [$\eta^5$-(4-CF$_3$Bz)C$_5$H$_4$]$_2$Ti[(D$_{C5H8}$)$_3$Bu$^n$]$_2$ | B(C$_6$F$_5$)$_3$ |
| o-Bzn-($\eta^5$-1-(3-Me)Ind]$_2$HfCl[(D$_{C5H8}$)$_5$Bu$^t$] | 9,9'-bis(9H-fluorene 1,1',2,2',3,3',4,4',-5,5',6,6',7,7',8,8' hexadeca-fluorine |
| Cp$_2$Zr[(A$_{C8H8}$)$_3$Bu$^n$]$_2$ | B(C$_6$F$_5$)$_4$CPh$_3$ |
| [$\eta^5$-(3,5-(CF$_3$)$_2$Bz)C$_5$H$_4$]$_2$Ti[(B$_{C4H6}$)$_7$Pr$^i$] | 1,2,3,4,5,6,7,8-octafluoro-9-hydroxy-9-(pentafluoro phenyl) fluorene |
| ($\eta^5$-Ind)$_2$Zr[(D$_{C5H8}$)$_6$Bu$^{it}$]$_2$ | 1,2,3,4,5,6,7,8-octafluoro-fluorene |
| Pro$^i$(Cp)($\eta^5$-Flu)]Ti[(D$_{C5H8}$)$_5$Bu$^t$]$_2$ | B(C$_6$F$_5$)$_4$NHPh(Me) |
| CpTi[(D$_{C5H8}$)$_3$(A$_{C8H8}$)$_3$ Pr$^i$]$_2$ | Al(C$_6$F$_5$)$_3$ |

TABLE 1-continued

| Metallocene complex (i) | Ionising activator (ii) |
|---|---|
| [Pro$^i$(Cp)($\eta^5$-Flu)]Zr[(D$_{C5H8}$)$_3$(A$_{C8H8}$)$_3$Pr$^i$]$_2$ | methyl alumoxane |
| Cp$_2$Zr[(A$_{C8H8}$)$_{20}$Bu$^t$]$_2$ | AlMe$_3$/(Et$_3$Sn)$_2$O |
| o-Bzn-[$\eta^5$-1-(4,7-diphenyl)Ind]$_2$Zr[(B$_{C4H6}$)$_5$Bu$^t$]$_2$ | AlMe$_3$/(Et$_3$Sn)$_2$O |
| Cp$_2$Zr[(D$_{C5H8}$)$_{10}$pr$^i$]$_2$ | 1,2,3,4,5,6,7,8-octafluoro-9-hydroxy-9-(pentafluoro phenyl)fluorene |
| [1,2-en($\eta^5$-1(2,4(CF$_3$)$_2$Bz)Ind)$_2$]Zr[(D$_{C5H8}$)$_5$Bu$^t$]$_2$ | 1,2,3,4,5,6,7,8-octafluoro-9-(pentafluoro phenyl)fluorene |
| Cp$_2$ZrCl[(D$_{C5H8}$)$_3$Pr$^i$] | B(C$_6$F$_5$)$_4$CPh$_3$ |

Caption: Cp = $\eta^5$-cyclopentadienyl; Pr$^i$ = isopropyl; D$_{C5H8}$ = monomeric unit deriving from isoprene; A$_{C8H8}$ = monomeric unit deriving from styrene; B$_{C4H6}$ = monomeric unit deriving from butadiene; Bu$^n$ = normal butyl; Bu$^t$ = tert-butyl; Me = methyl; Et = ethyl; Bz = benzyl; Pro$^i$ = 2,2-isopropylidene; Ph = phenyl; Ind = indenyl; THInd = 4,5,6,7-tetrahydro indenyl; Flu = fluorenyl; 1,2-en = 1,2-ethylidene; Ph$_2$Si = biphenyl silylene; Me$_2$Si = dimethyl silylene; o-Xen = ortho-xylylene, o-Bzn = ortho-benzylidene.

According to another aspect of the present invention, in order to produce solid components for the formation of polymerization catalysts of olefins, the above complexes can also be supported on inert solids, preferably consisting of Si and/or Al oxides, such as, for example, silica, alumina or silico-aluminates. The known supporting techniques can be used for supporting these catalysts, normally comprising contact, in a suitable inert liquid medium, between the carrier, optionally activated by heating to temperatures higher than 200° C., and one or both of components (i) and (ii) of the catalyst of the present invention. For the purposes of the present invention, it is not necessary for both components to be supported, as only the complex of formula (II), or the organic compound of B, Al, Ga or Sn as defined above, can be present on the surface of the carrier. In the latter case, the component which is not present on the surface is subsequently put in contact with the supported component, at the moment in which the active catalyst for the polymerization is to be formed.

Complexes and catalytic systems based thereon, which have been supported on a solid component by the functionalization of the latter and formation of a covalent bond between the solid component and a metallocene complex included in the previous formula (II), are also included in the scope of the present invention.

A particular method for forming the supported catalyst according to the present invention comprises pre-polymerizing a relatively small fraction of monomer or mixture of monomers in the presence of the catalyst, so as to incorporate it in a solid micro-particulate which is then fed to the actual reactor to complete the process in the presence of additional α-olefin. This allows a better control of the morphology and dimensions of the polymeric particulate obtained at the end.

One or more additives or components can be optionally added to the catalyst according to the present invention, in addition to the two components (i) or (ii), to obtain a catalytic system suitable for satisfying specific requisites in practice. The catalytic systems thus obtained should be considered as being included in the scope of the present invention. Additives or components which can be included in the preparation and/or formulation of the catalyst of the present invention are inert solvents such as, for example, aliphatic and/or aromatic hydrocarbons, aliphatic and aromatic ethers, weakly coordinating additives (Lewis bases) selected, for example, from non-polymerizable olefins, ethers, tertiary amines and alcohols, halogenating agents such as silicon halides, halogenated hydrocarbons, preferably chlorinated, etc., and again all other possible components normally used in the art for the preparation of traditional catalysts for the (co)polymerization of ethylene and other α-olefins.

Components (i) and (ii) form the catalytic composition according to the present invention by contact with each other, preferably at temperatures ranging from room temperature to 60° C. and for times varying from 10 seconds to 1 hour, more preferably from 30 seconds to 10 minutes.

The catalytic compositions according to the present invention can be used with excellent results in substantially all known (co)polymerization processes of α-olefins, both in continuous and batchwise, in one or more steps, such as, for example, low pressure (0.1–1.0 MPa), medium pressure (1.0–10 MPa) and high pressure (10–150 MPa) processes, at temperatures ranging from 20 to 240° C., optionally in the presence of an inert diluent. Hydrogen can be conveniently used as molecular weight regulator.

A further object of the present invention therefore relates to a process for the (co)polymerization of at least one α-olefin, comprising polymerizing said α-olefin, under suitable pressure and temperature conditions, in the presence of at least one catalytic composition according to the present invention, as described above.

These processes can be carried out in solution or suspension in a liquid diluent normally consisting of an aliphatic or cycloaliphatic saturated hydrocarbon, having from 3 to 8 carbon atoms, but which can also consist of a monomer as; for example, in the known co-polymerization process of ethylene and propylene in liquid propylene. The quantity of catalytic introduced into the polymerization mixture is preferably selected so that the concentration of the metal M ranges from $10^{-5}$ to $10^{-8}$ moles/liter.

Alternatively, the polymerization can be carried out in gas phase, for example, in a fluid bed reactor, normally at pressures ranging from 0.5 to 5 MPa and at temperatures ranging from 50 to 150° C.

α-olefins which can be polymerized or copolymerized in accordance with the process of the present invention are generally all olefinically unsaturated hydrocarbons having at least one double bond >C=CH$_2$ in so-called -α, or primary position. These α-olefins comprise ethylene and its upper homologous products, preferably having from 3 to 15 carbon atoms, such as, for example, propylene, 1-butene, butadiene, 1-hexene, 1-octene, 1-decene, 1-undecene, 1,4-hexadiene, isoprene, isobutene, vinylidene-norbornene, styrene, p-methylstyrene, 2-vinylnaphthalene. Particular non-primary olefins, having the double bond included in a tensioned ring, such as, for example, dicyclopentadiene or norbornene, can be equally (co)polymerized, under suitable conditions, in the presence of the catalytic composition of the present invention.

According to a particular aspect of the present invention, the catalytic composition for the (co)polymerization of α-olefins is prepared separately (preformed) by contact of components (i) and (ii), and subsequently introduced into the polymerization environment. Said composition can be charged first into the polymerization reactor, followed by the reagent mixture containing the olefin or mixture of olefins to be polymerized, or the catalytic composition can be charged into the reactor already containing the reagent mixture, or, finally, the reagent mixture and the catalytic composition can be contemporaneously fed to the reactor, both in continuous and batchwise.

According to another aspect of the present invention, the catalytic composition is formed in situ, for example by introducing components (i) and (ii) separately into the polymerization reactor containing the pre-selected olefin monomers.

The catalytic compositions according to the present invention can be used with excellent results in the polymerization of ethylene to give linear polyethylene and in the copolymerization of ethylene with propylene or higher α-olefins, preferably having from 4 to 10 carbon atoms, to give copolymers having different characteristics depending on the specific polymerization conditions and on the quantity and structure of the α-olefin. For example, linear polyethylenes can be obtained, with a density ranging from 0.880 to 0.940, and with molecular weights ranging from 10,000 to 2,000,000. The α-olefins preferably used as comonomers of ethylene in the production of low or medium density linear polyethylene (known with the abbreviations ULDPE, VLDPE and LLDPE, depending on the density), are, 1-butene, 1-hexene and 1-octene.

The catalytic composition of the present invention can also be conveniently used in copolymerization processes of ethylene and propylene to give saturated elastomeric copolymers vulcanizable by means of peroxides and extremely resistant to aging and degradation, or in the terpolymerization of ethylene, propylene and a non-conjugated diene, having from 5 to 20 carbon atoms, to obtain vulcanizable rubbers of the EPDM type. In these latter processes, it has been found that the catalytic compositions of the present invention allow polymers to be obtained, with a particularly high diene content and average molecular weight under the polymerization conditions.

For the preparation of EPDM, dienes which can be used for preparing these terpolymers are preferably selected from:
dienes with a linear chain such as 1,4-hexadiene and 1,6-octadiene;
branched dienes such as 5-methyl-1,4-hexadiene; 3,7-dimethyl-1,6-octadiene; 3,7-dimethyl-1,7-octadiene;
dienes with a single ring such as 1,4-cyclohexadiene; 1,5-cyclo-octadiene; 1,5-cyclododecadiene;
dienes with condensed bridged rings such as dicyclopentadiene; bicyclo[2.2.1]hepta-2,5-diene; alkenyl, alkylidene, cyclo-alkenyl and cyclo-alkylidene norbornenes such as 5-methylene-2-norbornene, 5-ethylidene-2-norbornene (ENB), 5-propenyl-2-norbornene.

Among the non-conjugated dienes typically used for preparing these copolymers, dienes containing at least one double bond in a tensioned ring are preferred, even more preferably 5-ethylidene-2-norbornene (ENB), and also 1,4-hexadiene and 1,6-octadiene.

In the case of EPDM terpolymers, the quantity of diene monomer conveniently does not exceed 15% by weight, and preferably ranges from 2 to 10% by weight. The propylene content, on the other hand, conveniently ranges from 20 to 50% by weight.

The catalysts of the present invention can also be used in homo- and co-polymerization processes of α-olefins according to the known techniques, obtaining with excellent yields atactic, isotactic or syndiotactic polymers, depending on the structure and geometry of the metallocene complex of formula (XI). α-olefins suitable for the purpose are those having from 3 to 20 carbon atoms, optionally also comprising halogens or aromatic nucleuses such as, for example, propylene, 1-butene, 1-hexene, 4-methyl-1-pentene, 1-decene and styrene.

The present invention is further described by the following examples which, however, are provided for illustrative purposes alone and in no way limit the overall scope of the invention itself.

EXAMPLES

The analytical techniques and characterization methods listed and briefly illustrated below are used in the following examples.

The characterization by means of $^1$H-NMR spectroscopy is carried out on a Bruker® MSL-300 nuclear magnetic resonance spectrophotometer.

The characterization of the products and organic intermediates by means of gas-chromatography/mass spectrography (GC-Mass) was effected using a Finnigan® TSQ 700 instrument.

The measurement of the molecular weights of the olefin polymers and diene oligomers was effected by means of Gel-Permeation Chromatography (GPC). The analyses of the samples were carried out in 1,2,4-trichloro-benzene (stabilized with Santonox®) at 135° C. with a WATERS® 150-CV chromatograph, using a Waters differential refractometer as detector. The chromatographic separation was obtained using a set of μ-Styragel HT (Waters) columns, three of which with a pore-size of $10^3$, $10^4$, $10^5$ Å, respectively, and two with a pore-size of $10^6$ Å, with an eluant flow-rate of 1 ml/min. The data were acquired and processed by means of Maxima 820 software version 3.30 (Millipore®); the calculation of the number average molecular weight (Mn) and weight average molecular weight (Mw) was effected by means of universal calibration, using calibration standards of polystyrene with molecular weights within the range of 6,500,000–2,000.

The characterization of the oligomeric products having formula (I) in the solutions prepared for the living anionic oligomerization, was effected by taking an aliquot which is quenched with MeOH and HCl at 37% and extracted with $CH_2Cl_2$. The organic extract is washed with water until a neutral pH is reached, anhydrified on $Na_2SO_4$, filtered and the solvent evaporated; an oil is obtained which is analyzed by means of the above-mentioned GPC and $^1$H-NMR techniques. The NMR characterization is based on known techniques, for example according to what is described in the publications: J. A. Frankland et alii, Spectrochimica Acta; vol 47A Nr 11, pages 1511–24 (1991); H. Sato et alii, J. Polym. Sci.: Polymer Chemistry, vol 17, pages 3551–58 (1979); T. Suzuki et alii, JACS, vol 11(4), 639 (1978); H. Tanaka et alii, Polymer, vol 17, 113 (1976).

The EPR characterization was carried out with a Brucker ESP300E spectrometer. The solutions of the samples in toluene were analyzed as such, by simple transfer into the sample-holder tube, at room temperature.

During the preparations listed in the examples, the following reagents were used:

methyllithium (LiMe) 1.6 M in diethyl ether (ALDRICH);
n-butyllithium (LiBu) 2.5 M in hexane (ALDRICH);
t-butyllithium (LiBu$^t$) 1.5 M in pentane (ALDRICH);
triisobutylaluminum (TIBAL) (CROMPTON);
(pentamethyl-$\eta^2$-cyclopentadienyl)titanium(IV) trichloride [CP*TiCl$_3$] (CROMPTON);
1,2-ethylene-bis(indenyl)zirconium dichloride [et-(ind)$_2$ZrCl$_2$] (CROMPTON);
bis cyclopentadienyl titanium dichloride [Cp$_2$TiCl$_2$] (CROMPTON);
methylaluminoxane (MAO) (10% (weight Al)/volume in toluene) (CROMPTON);
isoprene (polymerization grade) (ALDRICH), distilled on NaH under argon;
styrene (polymerization grade) (ALDRICH), distilled at low pressure on CaH$_2$.

The reagents and/or solvents used which do not appear in the above list, are those commonly adopted in laboratory practice and on an industrial scale, and can therefore be easily found on the specialized market. In performing the operations described in the examples, the procedures and precautions of standard practice were observed, particularly for reactions effected with organometallic compounds in an inert atmosphere and with anhydrous solvents.

Preparative Example 1

In a series of tests for establishing the reproducibility of the preparation of oligomers by means of living polymerization, an excellent concordance between the theoretical value of the polymerization grade (moles of monomer/moles of initiator charged) and the experimental value measured by means of the above-mentioned characterization techniques, was observed. In a typical preparation of an oligomer having an average polymerization degree of 6.3, 17 ml of a 1.5 M solution of t-butyl lithium (4.76 mmoles) in pentane are charged, under stirring, into a test-tube containing 10 ml of anhydrous hexane. 1.95 g (28.56 mmoles) of isoprene freshly distilled on NaH (Isoprene/Li=6) are added dropwise to the solution, cooled with a water/ice bath. When the addition of isoprene is terminated, the mixture is heated to room temperature, under stirring. The oligomerization reaction is rapidly completed during the heating. An aliquot of the solution is removed and analyzed as specified above. Both 1–4 and 1–2 monomeric units were found, deriving from polymerization with addition, according to the typical distribution of anionic polymerization. An excellent concordance (average deviation lower than 10%) between the theoretical value of the polymerization grade (moles of monomer/moles of t-butyllithium) and the measured value, were found.

Preparative Example 2

Operating in accordance with the above preparative example, 3.17 ml of a 1.5 M solution of t-butyllithium (4.76 mmoles) in pentane, are charged, under stirring, into a test-tube containing 10 ml of anhydrous hexane. 1.95 g (28.56 mmoles) of isoprene (isoprene/Li ratio=6) are slowly added to the solution, cooled with a water/ice bath. Once the addition of isoprene is terminated, the mixture is heated to room temperature, under stirring. A solution of lithium polyisoprenyl is obtained, with an average polymerization degree of 6. A suspension of 0.9 g (2.14 mmoles) of Et(Ind)$_2$ZrCl$_2$ in 50 ml of toluene is slowly added to the solution. The mixture is left under stirring for 5 hours. The solution is filtered on a G4 porous septum. The solvent is then removed by evaporation under vacuum, obtaining 2.3 g of a waxy, orange-coloured solid, which, upon characterization, proved to essentially consist of an Et(Ind)$_2$Zr(polyisoprenyl)$_2$ complex with an average polymerization degree of isoprene equal to 6 (yield 84%), called "Zr(I6)$_2$ complex".

Elemental analysis for C$_2$H$_4$(C$_9$H$_6$)$_2$Zr[(C$_5$H$_8$)$_6$C$_4$H$_9$]$_2$ (molecular weight 1279.2) Theoretical: Zr=7.13% Found: Zr=7.10%

Preparative Example 3

The procedure of the previous preparative example 2 is reproduced, operating with the same reagents and in the same proportions, but using 1.8 g (4.28 mmoles) of Et(Ind)$_2$ZrCl$_2$ suspended in about 70 ml of toluene, instead of 0.9 g previously used, thus obtaining, at the end, a complex essentially containing only one unsaturated oligomeric group. The solution is left under stirring for 5 hours and is then filtered on a G4 porous septum. The solvent is then removed by evaporation under vacuum, obtaining about 3 g of a waxy, orange-coloured solid, which, upon characterization, proved to essentially consist of an Et(Ind)$_2$Zr(polyisoprenyl)Cl complex with an average polymerization degree of isoprene equal to 6 (yield 84%), called "ZrI6 complex".

Elemental analysis for C$_2$H$_4$(C$_9$H$_6$)$_2$ZrCl(C$_5$H$_8$)$_6$C$_4$H$_9$ (molecular weight 848.8) Theoretical: Zr=10.75%, Cl=4.18% Found: Zr=10.3%, Cl=4.22%

Preparative Example 4

Operating with the same procedure in accordance with the above Preparative Example 1, 1.76 ml (3 mmoles) of a 1.7 M solution in pentane of t-butyllithium are charged, under stirring, into a test-tube containing 2.1 ml of anhydrous cyclohexane and 0.6 ml (6 mmoles) of isoprene (isoprene/Li=2). The solution is left under stirring for about 2.5 hours and a suspension of 0.567 g (1.35 mmoles) of Et(Ind)$_2$ZrCl$_2$ in about 25 ml of toluene is slowly added to the solution. The mixture, which immediately becomes orange-coloured, is left under stirring for 5 hours. It is filtered on a porous septum (G4) in an inert atmosphere; the filtrate is evaporated under vacuum, obtaining about 0.83 g of a waxy, orange-coloured solid, which, upon characterization, proved to essentially consist of an Et(Ind)$_2$Zr(polyisoprenyl)$_2$ complex with an average polymerization degree of isoprene equal to 2 (yield 84%), called "Zr(I2)$_2$ complex".

Elemental analysis for C$_2$H$_4$(C$_9$H$_6$)$_2$Zr[(C$_5$H$_8$)$_2$C$_4$H$_9$]$_2$ (molecular weight=734)
Theoretical: Zr=12.4%
Found: Zr=12.4%

Preparative Example 5

Operating with the same procedure in accordance with Preparative Example 1 above, 5.1 ml (8 mmoles) of a 1.57 M solution in pentane of t-butyllithium are charged, under stirring, into a test-tube containing 13.6 ml of anhydrous cyclohexane and 4 ml (40 mmoles) of isoprene (isoprene/Li=5). The solution is left under stirring for about 3 hours. A suspension of 1.67 g (4 mmoles) of Et(Ind)$_2$ZrCl$_2$ (Li—R/Zr=2) in toluene (about 50 ml) is slowly added to the solution. The mixture, which immediately becomes orange-coloured, is left under stirring for 5 hours. It is filtered on a porous septum (G4) in an inert atmosphere; the filtrate is evaporated under vacuum, obtaining about 3.9 g of a waxy, orange-coloured solid, which, upon characterization, proved to essentially consist of an Et(Ind)$_2$Zr(polyisoprenyl)$_2$ complex with an average polymerization degree of isoprene equal to 5 (yield 85%), called "Zr(I5)$_2$ complex".

Elemental analysis for C$_2$H$_4$(C$_9$H$_6$)$_2$Zr[(C$_5$H$_8$)$_5$C$_4$H$_9$]$_2$ (molecular weight=1143)

Theoretical: Zr=7.98%

Found: Zr=8.0%

Preparative Example 6

Operating with the same procedure in accordance with the Preparative Example 1 above, 2.55 ml (4 mmoles) of a 1.57 M solution in pentane of t-butyllithium are charged, under stirring, into a test-tube containing 13.6 ml of anhydrous cyclohexane and 4 ml (40 mmoles) of isoprene (isoprene/Li=10). The solution is left under stirring for about 3 hours. A suspension of 0.84 g (2 mmoles) of Et(Ind)$_2$ZrCl$_2$ (Li—R/Zr=2) in toluene (about 30 ml) is slowly added to the solution. The mixture, which immediately becomes orange-coloured, is left under stirring for 5 hours. It is filtered on a porous septum (G4) in an inert atmosphere; the filtrate is evaporated under vacuum, obtaining about 3.13 g of a waxy, orange-coloured solid, which, upon characterization, proved to essentially consist of an Et(Ind)$_2$Zr(polyisoprenyl)$_2$ complex with an average polymerization degree of isoprene equal to 10 (yield 86%), called "Zr(I10)$_2$ complex".

Elemental analysis for C$_2$H$_4$(C$_9$H$_6$)$_2$Zr[(C$_5$H$_8$)$_{10}$C$_4$H$_9$]$_2$ (molecular weight=1824) Theoretical: Zr=5.00% Found: Zr=4.93%

Preparative Example 7

5.1 ml (8 mmoles) of a 1.57 M solution in pentane of t-butyllithium are charged, under stirring, into a test-tube containing 13.6 ml of anhydrous cyclohexane and 4.58 ml (40 mmoles) of styrene freshly distilled on CaH$_2$ (styrene/Li=5). The solution is left under stirring for about 3 hours. A suspension of 1.67 g (4 mmoles) of Et(Ind)$_2$ZrCl$_2$ (Li—R/Zr=2) in toluene (about 50 ml) is slowly added to the solution. The mixture, which immediately becomes orange-coloured, is left under stirring for 5 hours. It is filtered on a porous septum (G4) in an inert atmosphere; the filtrate is evaporated under vacuum, obtaining about 4.8 g of a waxy, reddish-orange solid, which, upon characterization, proved to essentially consist of an Et(Ind)$_2$Zr(polystyryl)$_2$ complex with an average polymerization degree of styrene equal to 5 (yield 80%), called "Zr(S5)$_2$ complex".

Elemental analysis for C$_2$H$_4$(C$_9$H$_6$)$_2$Zr[(C$_8$H$_8$)$_5$C$_4$H$_9$]$_2$ (molecular weight=1503)

Theoretical: Zr=6.07%

Found: Zr=5.92%

Preparative Example 8

Operating with the same procedure in accordance with the Preparative Example 1 above, 5.1 ml (8 mmoles) of a 1.57 M solution in pentane of t-butyllithium are charged, under stirring, into a test-tube containing 13.6 ml of anhydrous cyclohexane and 4 ml (40 mmoles) of isoprene freshly distilled on NaH (isoprene/Li=5). The solution is left under stirring for about 3 hours. A suspension of 2.18 g (4 mmoles) of o-benzylidene bis-($\eta^5$-1-indenyl)zirconium dichloride [formula C$_6$H$_4$CH$_2$(Ind)$_2$ZrCl$_2$, obtained in accordance with the synthesis procedure described in example 1 of Italian patent nr. 1298616 (granted to the Applicant)] in about 50 ml of toluene is slowly added to the solution. The mixture is left under stirring for 5 hours and is then filtered on a porous septum (G4) in an inert atmosphere; the filtrate is evaporated under vacuum, obtaining about 4.27 g of a waxy, orange-coloured solid is obtained, which, upon characterization, proved to essentially consist of an o-benzylidene bis-($\eta^5$-1-indenyl)Zr(polyisoprenyl)$_2$ complex with an average polymerization degree of isoprene equal to 5 (yield 84%), called "ZrBz(I5)$_2$ complex".

Elemental analysis for C$_6$H$_4$CH$_2$(C$_9$H$_6$)$_2$Zr[(C$_5$H$_8$)$_5$C$_4$H$_9$]$_2$ (molecular weight=1205)

Theoretical: Zr=7.57%

Found: Zr=7.38%

Preparative Example 9

1.65 ml (2.8 mmoles) of a 1.7 M solution in pentane of t-butyllithium are charged, under stirring, into a test tube containing 2 ml of anhydrous cyclohexane. 0.38 g (5.6 mmoles) of isoprene are added dropwise to the solution, under stirring. A solution, obtained by dissolving 0.6 g (2.8 mmoles) of bis(cyclopentadienyl)titanium(III) chloride [formula Cp$_2$TiCl (Cp=C$_5$H$_5$); prepared from Cp$_2$TiCl$_2$ according to the procedure described in the publication "Inorganic Synthesis", vol. 21, page 84] in 40 ml of toluene, is slowly added to the solution. The mixture is left under stirring for 2 hours and the colour changes from red to purple. The solution is filtered on a G4 porous septum and the solvent is removed by evaporation under vacuum; 1 g of a purple-coloured solid is obtained, which, upon characterization, proved to essentially consist of a bis-($\eta^5$-cyclopentadienyl)Ti(polyisoprenyl) complex with an average polymerization degree of isoprene equal to 2, called "TiI2 complex".

Elemental analysis for Cp$_2$Ti[(C$_5$H$_8$)$_2$C$_4$H$_9$] (molecular weight=371) Theoretical: Ti=12.9% Found: Ti=12.8%

Preparative Example 10

3.2 ml of a 1.5 M solution in pentane of t-butyllithium (4.8 mmoles) are charged, under stirring, into a test-tube containing 3.4 ml of anhydrous cyclohexane. 0.655 g (9.6 mmoles) of isoprene are added dropwise to the solution, under stirring. A solution of 0.55 g (2.2 mmoles) of Cp$_2$TiCl$_2$ in 25 ml of toluene, is slowly added to the solution. The mixture is left under stirring overnight, at room temperature. The colour changes from red to purple. The solution is filtered on a G4 porous septum and the solvent is removed by evaporation under vacuum, obtaining 0.8 g of a purple-coloured solid, which, upon characterization, proved to essentially consist of a bis-($\eta^5$-cyclopentadienyl)Ti(polyisoprenyl) complex with an average polymerization degree of isoprene equal to 2, essentially analogous to the TiI2 complex obtained in accordance with the previous preparative example 9. From EPR measurements, it was found that all the titanium is in oxidation state (III). We believe that during the preparation reaction, the titanium is reduced from oxidation state (IV) to state (III) through β-elimination, analogously to what is generally known with respect to titanium cyclopentadienyl dialkyl complexes.

Elemental analysis for Cp$_2$Ti[(C$_5$H$_8$)$_2$C$_4$H$_9$] (molecular weight=371)

Theoretical: Ti=12.89%

Found: Ti=12.79%

Preparative Example 11

3.2 ml (4.8 mmoles) of a 1.5 M solution in pentane of t-butyllithium are charged, under stirring, into a test-tube containing 3.4 ml of anhydrous cyclohexane. 0.655 g (9.6 mmoles) of isoprene are added dropwise to the solution, under stirring. A solution of 0.55 g (2.2 mmoles) of $Cp_2TiCl_2$ in 25 ml of toluene, is slowly added to the solution, cooled to about 0° C. with a water/ice bath and shielded from the light with an aluminum foil. The mixture is left under stirring overnight. The colour changes from red to dark brown. The solution is filtered on a G4 porous septum and the solvent is removed by evaporation under vacuum; 0.9 g of a brown-coloured solid are obtained, which, upon characterization by means of EPR and $^1H$ NMR, proved to essentially consist of a bis-($\eta^5$-cyclopentadienyl)Ti(IV) (polyisoprenyl)$_2$ complex with about 5% of the corresponding complex of Ti(III), in which the polyisoprenyl group has an average polymerization degree of isoprene equal to 2.

By effecting the reaction at low temperature and with photo-protection, the $\eta$-elimination reaction was inhibited, thus prevalently obtaining the desired Ti(IV) complex.

Elemental analysis: Ti 8.7% EPR analysis: Ti(III)=5%

Preparative Example 12

3.35 ml (5.7 mmoles) of a 1.7 M solution in pentane of t-butyllithium are charged, under stirring, into a test-tube containing 4 ml of anhydrous cyclohexane. 0.78 g (11.4 mmoles) of isoprene are added dropwise to the solution, under stirring. A solution of 0.55 g (1.9 mmoles) of (pentamethyl-$\eta^5$-cyclopentadienyl)titanium(IV) trichloride [formula $CP^*TiCl_3$, ($Cp^*=C_5(CH_3)_5$)] in 15 ml of toluene, is slowly added to the solution. The mixture is left under stirring overnight. The solution is filtered on a G4 porous septum and the solvent is removed by evaporation under vacuum; 1.3 g of a brown-coloured solid are obtained, which, upon characterization, proved to essentially consist of a tris-($Cp^*$)Ti(polyisoprenyl)$_3$ complex with an average polymerization degree of isoprene equal to 2, called "Ti(I2)$_3$ complex".

Elemental analysis for $Cp^*Ti[(C_5H_8)_2C_4H_9]_3$ (molecular weight=763)

Theoretical: Ti=6.27%

Found: Ti=6%

Example 1

Polymerization of Ethylene

All the preparative operations for carrying out the polymerization tests, in this example and in the following ones, are effected in vessels under vacuum, interrupted by three flushings with nitrogen for at least two hours, and in a nitrogen atmosphere; the reaction solvent (toluene or heptane) was distilled on sodium metal and preserved on molecular sieves; all other solvents were used as such.

500 ml of anhydrous toluene and 0.75 mmoles of TIBAL, as impurity scavenger, are charged, under a nitrogen flow, into a steel autoclave having a volume of 1 l, washed with a solution of aluminum triisobutyl in toluene and dried at a high temperature, under vacuum. The whole mixture is thermostat-regulated at 50° C. and at this point, 10 ml of a toluene solution containing $2.5 \cdot 10^{-3}$ mmoles of "Zr(I2)$_2$ complex", prepared according to the previous preparative example 4, and $2.5 \cdot 10^{-3}$ mmoles (2.3 mg) of $B(C_6F_5)_4CPh_3$ are charged, under a nitrogen flow, into the autoclave. After introducing the catalytic system, the autoclave is pressurized at 80 KPa with ethylene, maintaining the pressure constant for 30 minutes. At the end, the autoclave is depressurized and the polymerization is blocked with methanol. The polymer is recovered by precipitation in two liters of methanol acidified with hydrochloric acid, filtration and drying under vacuum at 40° C. for about 8 hours. 50 g of polyethylene are obtained, with a number average molecular weight (Mn) of 95,000 and a weight average molecular weight (Mw) of 200,000, with an average dispersion MWD=Mw/Mn of 2.1.

Example 2

Polymerization of Ethylene 98.5 ml of toluene containing 1 mmole/l of TIBAL as impurity scavenger, are charged into a 250 ml glass reactor, equipped with a magnetic stirrer and thermostat-regulated at 50° C. 10 ml of a toluene solution are added, under a nitrogen flow, containing $1.5 \cdot 10^{-3}$ mmoles of "Zr(I2)$_2$ complex" and $1.5 \cdot 10^{-3}$ mmoles (0.71 mg) of 1,2,3,4,5,6,7,8-octafluoro-9-(pentafluoro phenyl)fluorene (PFF), prepared as described in example 8 of the above-mentioned European patent application nr. 1,013,675.

The reactor is pressurized at 50 KPa (rel.) with ethylene and the mixture is maintained under stirring for 60 minutes at 50° C., continuously feeding ethylene to maintain the pressure constant at the initial value. At the end, the reactor is depressurized and 5 ml of methanol are introduced to complete the polymerization and deactivate the catalyst. The polymer is recovered by precipitation in 400 ml of methanol acidified with hydrochloric acid, filtration and drying under vacuum at 40° C. for about 8 hours. 15 g of polyethylene are obtained, with Mw=186,000, Mn=77,200 and MWD=2.4.

Example 3

Ethylene/1-Hexene Copolymerization

A solution of the polymerization catalyst according to the present invention is prepared separately, by dissolving 61 mg (0.048 mmoles) of the "TiI2 complex", prepared according to the previous preparative example 9, in 53 ml of anhydrous toluene, and adding 44 mg (0.048 mmoles) of $B(C_6F_5)_4CPh_3$ to this mixture, at room temperature, so that the atomic ratio B/Zr is equal to about 1. The catalyst solution thus prepared is left to mature, leaving it under stirring for 10 minutes at room temperature, before introducing it into the polymerization mixture.

900 ml of toluene (previously distilled on sodium metal), 60 ml of 1-hexene (previously distilled on calcium hydride $CaH_2$) and 1.5 mmoles of TIBAL as impurity scavenger, are charged into a BUCHI autoclave with a 2 liter glass reactor, equipped with a helix stirrer and thermostatic jacket, maintained under vacuum for at least two hours, interrupted by three flushings with nitrogen. The autoclave is pressurized with ethylene at 0.2 MPa, heated to a temperature of 40° C. and is then depressurized.

1.1 ml of the catalyst solution, prepared as above, are charged under an ethylene flow. The autoclave is again pressurized at 20 KPa with ethylene and the polymerization is carried out for 30 minutes, by thermostat-regulating the temperature at 40° C. and continuously feeding ethylene to keep the pressure constant during the test. At the end, the reaction is interrupted by adding 5 ml of methanol acidified with hydrochloric acid, the autoclave is depressurized and the polymer is recovered by precipitation with 3 liters of acidified methanol and subsequent washing with acetone. 10 g of an ethylene/1-hexene (LLDPE, activity 10 kg/mol Ti) copolymer are obtained after drying, having the following characteristics:

number average molecular weight (Mn) 123,000 and weight average molecular weight (Mw) 330,000
molecular weight distribution (MWD=Mw/Mn): 2.7
monomeric units deriving from 1-hexene (1-hexene inserted): 8%
monomer reactivity product ($r_1 \cdot r_2$): 0.64.

Example 4

Ethylene Polymerization with a Catalyst Prepared 6 Months Before and Preserved in a Refrigerator 500 ml of anhydrous toluene and 0.75 mmoles of TIBAL as impurity scavenger, are charged, under a nitrogen flow, into a 1 liter steel autoclave, washed with a solution of aluminum triisobutyl in toluene and dried at a high temperature and under vacuum. The liquid is thermostat-regulated at a temperature of 50° C. and 10 ml of a toluene solution, containing $2.5 \cdot 10^{-3}$ mmoles of aged "Zr(I2)$_2$ complex", prepared according to the previous preparative example 4 and preserved in a refrigerator at +5° C. for six months, are charged under a nitrogen flow. $2.5 \cdot 10^{-3}$ mmoles (2.3 mg) of $B(C_6F_5)_4CPh_3$ are then added and the autoclave is pressurized at 80 KPa (rel.) with ethylene, the pressure being maintained constant for the following 30 minutes by the continuous feeding of ethylene. At the end, the autoclave is depressurized and the reaction is stopped with methanol. The polymer is recovered by precipitation, by pouring the polymerization mixture into 2 liters of methanol acidified with hydrochloric acid and maintaining under vigorous stirring. After filtration and drying under vacuum at 40° C. for about 8 hours, 48 g of polyethylene are obtained, having Mn=95,300, Mw=195,000 and MWD=2.05.

Other embodiments and variations of the present invention, different from those specifically described and illustrated above, are however possible and accessible to technical experts in the art.

What is claimed is:

1. A catalytic composition for the (co)polymerization of ethylene and other α-olefins, comprising the following two components in contact with each other, or the product of their reaction:
   (i) a metallocene complex of a metal M of group 4 of the periodic table, including at least one η$^5$-cyclopentadienyl group and at least one unsaturated hydrocarbyl group R', bonded to the metal M;
   (ii) an ionizing activator which is at least one organic or organometallic compound capable of reacting with said metallocene complex (i) so as to form a positive ionic charge thereon by the extraction of an anion of an unsaturated hydrocarbylic organic group and formation of a non-coordinating anion with a delocalized ionic charge;
   wherein said unsaturated hydrocarbyl group R' has the following formula (I):

$$-(A_xD_yU_z)R' \qquad (I)$$

wherein:
   A represents any monomeric unit derived from a vinylaromatic group polymerizable by means of anionic polymerization, having from 6 to 20 carbon atoms;
   D represents any monomeric unit derived from a conjugated diolefin polymerizable by means of anionic polymerization, having from 4 to 20 carbon atoms;
   U represents any generic monomeric unit derived from an unsaturated compound co-polymerizable with any of the above conjugated diolefins D or vinylaromatic compounds A;
   R' represents hydrogen or a hydrocarbyl group having from 1 to 20 carbon atoms;
   the index "x" can be zero or an integer;
   the index "y" is an integer higher than zero;
   the index "z" can be zero or an integer ranging from 1 to 20; and
   the sum (x+y) is equal to or higher than 2.

2. The catalytic composition according to claim 1, wherein said activating component (ii) is selected from the group consisting of compounds belonging to one of the following four types:
   I) oxygenated organometallic compounds of metals of groups 13 or 14 of the periodic table;
   II) non-coordinating ionic organometallic compounds;
   III) non-coordinating Lewis acids, and
   IV) polyfluorinated cyclopentadienyl compounds.

3. The catalytic composition according to claim 2, wherein said component (ii) is selected from the group consisting of compounds of types II), III) and IV).

4. The catalytic composition according to claim 1, wherein said (x+y) sum is between 2 and 50.

5. The catalytic composition according to claim 1, wherein said metallocene complex in component (i) is represented by the following formula (II):

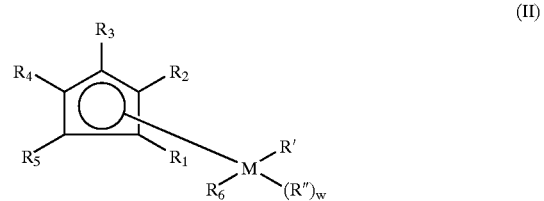

wherein:
   M is a metal selected from the group consisting of titanium, zirconium and hafnium, coordinatively bonded to a first η$^5$-cyclopentadienyl group;
   R" represents an organic or inorganic group bonded to the metal M, having an anionic nature, different from cyclopentadienyl or substituted cyclopentadienyl;
   the groups $R_1$, $R_2$, $R_3$, $R_4$, $R_5$, each independently, represents an atom or a radical bonded to said first η$^5$-cyclopentadienyl group, selected from the group consisting of hydrogen, organic groups and inorganic groups;
   $R_6$ represents an organic or inorganic group of an anionic nature, bonded to the metal M;
   "w" has the value of 0 or 1.

6. The catalytic composition according to claim 1, wherein said metal M is selected from the group consisting of titanium and zirconium.

7. The catalytic composition according to claim 1, wherein said metal M is zirconium in oxidation state +4.

8. The catalytic composition according to claim 1, wherein said monomeric units of the D type in formula (I) derive from 1,3-diolefins with 4 to 20 carbon atoms.

9. The catalytic composition according to claim 8, wherein said 1,3-diolefin is selected from the group consisting of 1,3-butadiene, isoprene, 1,3-pentadiene, 2-methyl-1,3-pentadiene and 1,3-hexadiene.

10. The catalytic composition according to claim 1, wherein said monomeric units of the A type in formula (I) derive from hydrocarbyl vinyl aromatic compounds having from 8 to 15 carbon atoms.

11. The catalytic composition according to claim 10, wherein said vinyl aromatic compound is selected from the group consisting of styrene, α-methylstyrene, p-methylstyrene, and vinylnaphthalene.

12. The catalytic composition according to claim 1, wherein the sum of the indexes (x+y+z) in formula (I) is between 2 and 15.

13. The catalytic composition according to claim 1, wherein "z" in formula (I) is equal to 0.

14. The catalytic composition according to claim 1, wherein "x" and "z" in formula (I) are both equal to 0 and said group R' consists of an oligomer of a conjugated diene D having an average polymerization degree from 2 to 15.

15. The catalytic composition according to claim 1, wherein said group $R^I$ in formula (I) represents an aliphatic, cycloaliphatic, aromatic or alkyl aromatic group having from 2 to 10 carbon atoms.

16. The catalytic composition according to claim 5, wherein both groups R' and R", in the complex of formula (II), are independently oligomeric groups of formula (I).

17. The catalytic composition according to claim 5, wherein said group $R_6$, in the complex of formula (II), is bridged to said first cyclopentadienyl group, to form, as a whole, a cyclic structure including the metal M.

18. The catalytic composition according to claim 5, wherein said group $R_6$, in the complex of formula (II), represents a second cyclopentadienyl group $\eta^5$-coordinated to the metal M.

19. The catalytic composition according to claim 18, wherein said first and second cyclopentadienyl group are equal to each other.

20. The catalytic composition according to claim 5, wherein said complex of formula (II) includes three oligomeric groups of formula (I), in addition to said first η-cyclopentadienyl group.

21. The catalytic composition according to claim 5, wherein said activator (ii) is an oligomeric or polymeric organo-oxygenated compound of aluminum.

22. The catalytic composition according to claim 21, wherein said activator (ii) is a polymeric aluminoxane including, in each molecule, from 4 to 70 repetition units having the following formula (VI):

(VI)

wherein $R_7$ is an alkyl $C_1-C_6$ group.

23. The catalytic composition according to claim 2, wherein said activator (ii) is a compound of type II) which is an ionic organometallic compound of a metal M' selected from the group consisting of boron, aluminum and gallium.

24. The catalytic composition according to claim 23, wherein said activator (ii) is a compound or a mixture of compounds having one of the following general formulae:

$[(R_c)_xNH_{4-x}]^+·[B(R_D)_4]^-$; $[Ph_3C]^+·[B(R_D)_4]^-$;

$[(R_c)_3PH]^+·[B(R_D)_4]^-$; $[Li]^+·[B(R_D)_4]^-$; $[Li]^+·[Al(R_D)_4]^-$;

wherein the subscript "x" is an integer between 0 and 3, each $R_c$ group independently represents an alkyl or aryl radical with from 1 to 10 carbon atoms, and each $R_D$ group independently represents an at least partially fluorinated aryl radical having from 6 to 20 carbon atoms.

25. The catalytic composition according to claim 1, wherein said ionizing activator (ii) is a strong Lewis acid.

26. The catalytic composition according to claim 1, wherein said ionizing activator (ii) includes at least one fluorinated organic compound having the following formula (VII):

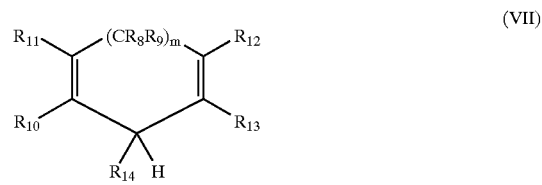

(VII)

wherein:

each $R_i$ (where "i" is an integer from 10 to 14), $R_8$ and $R_9$ group is a substituent of the di-unsaturated cycle independently selected from the group consisting of hydrogen, fluorine, an optionally fluorinated aliphatic hydrocarbyl group, and an optionally fluorinated aromatic hydrocarbyl group, having from 1 to 20 carbon atoms, optionally bonded to a different hydrocarbyl $R_i$ group adjacent thereto, to form a further condensed cycle with said di-unsaturated cycle, on the condition that at least three of the $R_8$, $R_9$, $R_{10}$, $R_{11}$, $R_{12}$, and $R_{13}$, groups, are independently selected, from the group (a) consisting of:

fluorine, a fluorinated alkyl group having the formula —CF(R'$_1$R'$_2$), a fluorinated aryl group $Ar_F$, substituted on the aromatic ring, with at least two groups selected from the group consisting of fluorine, a —CF(R'$_1$R'$_2$) group as defined above, and a different $Ar_F$ group, and a fluorinated vinyl group $V_F$, substituted on at least two positions of the double bond with groups selected from the group consisting of fluorine, a —CF(R'$_1$R'$_2$) group and an $Ar_F$ group, as defined above;

wherein each R'$_1$ or R'$_2$ can have any of the above meanings of the $R_i$ groups, and at least one of them is fluorine or fluorinated alkyl at least in position 1, or a fluorinated aryl $Ar_F$ as defined above, or a fluorinated vinyl group $V_F$ as defined above; and "in" can have the value of 1 or 0.

27. The catalytic composition according to claim 26, wherein "m" in said fluorinated organic compound of formula (VII) is equal to 0.

28. The catalytic composition according to claim 26, wherein said compound of formula (VII) is a fluorinated fluorenyl compound having the following formula (VIII):

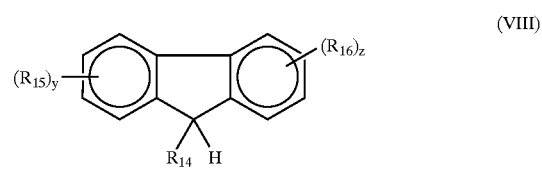

(VIII)

wherein:
R$_{14}$ has the same meaning defined for the compounds of formula (VII);
(y) is an integer from 1 to 4;
(z) is an integer from 1 to 4;
the groups R$_{15}$ and R$_{16}$ are independently substituents of each hydrogen atom of the respective aromatic ring in one or more of the four positions available, and are selected from the group consisting of fluorine, an optionally fluorinated aliphatic hydrocarbyl group, and an optionally fluorinated aromatic hydrocarbyl group, having from 1 to 20 carbon atoms, optionally bonded to a different R$_{15}$ or, R$_{16}$ hydrocarbyl group, respectively, to form a further cycle,
on the condition that at least 3 of said R$_{14}$, R$_{15}$ and R$_{16}$ groups are independently selected from the group (b) consisting of:
fluorine,
a fluorinated alkyl group having the formula —CF(R'$_1$R'$_2$), wherein each R'$_1$ or R'$_2$ group can have any of the above meanings of the R$_i$ groups and at least one of these is fluorine, or fluorinated alkyl at least in position 1, or a fluorinated alkyl Ar$_F$ as defined below, or a fluorinated vinyl group V$_F$ as defined below,
a fluorinated aryl group Ar$_F$, substituted on the aromatic ring, with at least two groups selected from the group consisting of fluorine, a —CF(R'$_1$R'$_2$) group as defined above, and a different Ar$_F$ group and
a fluorinated vinyl group V$_F$, substituted on at least two positions of the double bond with groups selected from the group consisting of fluorine, a —CF (R'$_1$R'$_2$) group and an Ar$_F$ group, as defined above.

29. The catalytic composition according to claim 26, wherein said fluorinated organic compound having formula (VII) in said activator (ii), is added to the catalytic composition in a molar ratio between 1 and 10, with respect to the moles of the metallocene complex (i).

30. A process comprising (co) polymerization of at least one α-olefin, in the presence of a catalytic composition comprising the following two components in contact with each other, or the product of their reaction:
(i) a metallocene complex of a metal M of group 4 of the periodic table, including at least one η$^5$-cyclopentadienyl group and at least one unsaturated hydrocarbyl group R', bonded to the metal M;
(ii) an ionizing activator which is at least one organic or organometallic compound capable of reacting with said metallocene complex (i) so as to form a positive ionic charge thereon by the extraction of an anion of an unsaturated hydrocarbylic organic group and formation of a non-coordinating anion with a delocalized ionic charge;
wherein said unsaturated hydrocarbyl group R' has the following formula (I):

  (I)

wherein:
A represents any monomeric unit derived from a vinylaromatic group polymerizable by means of anionic polymerization, having from 6 to 20 carbon atoms;
D represents any monomeric unit derived from a conjugated diolefin polymerizable by means of anionic polymerization, having from 4 to 20 carbon atoms;
U represents any generic monomeric unit derived from an unsaturated compound co-polymerizable with any of the above conjugated diolefins D or vinylaromatic compounds A;

R$^I$ represents hydrogen or a hydrocarbyl group having from 1 to 20 carbon atoms,
each index "x" and "y" can be independently zero or an integer, provided the sum (x+y) is equal to or higher than 2;
the index "z" can be zero or an integer ranging from 1 to 20.

31. A process comprising (co) polymerization of at least one α-olefin, in the presence of a catalytic composition comprising the following two components in contact with each other, or the product of their reaction:
(i) a metallocene complex of a metal M of group 4 of the periodic table, including at least one η$^5$-cyclopentadienyl group and at least one unsaturated hydrocarbyl group R', bonded to the metal M;
(ii) an ionizing activator which is at least one organic or organometallic compound capable of reacting with said metallocene complex (i) so as to form a positive ionic charge thereon by the extraction of an anion of an unsaturated hydrocarbylic organic group and formation of a non-coordinating anion with a delocalized ionic charge;
wherein said unsaturated hydrocarbyl group R' has the following formula (I):

  (I)

wherein:
A represents any monomeric unit derived from a vinylaromatic group polymerizable by means of anionic polymerization, having from 6 to 20 carbon atoms;
D represents any monomeric unit derived from a conjugated diolefin polymerizable by means of anionic polymerization, having from 4 to 20 carbon atoms;
U represents any generic monomeric unit derived from an unsaturated compound co-polymerizable with any of the above conjugated diolefins D or vinylaromatic compounds A;
R$^I$ represents hydrogen or a hydrocarbyl group having from 1 to 20 carbon atoms;
the index "x" can be zero or an integer;
the index "y" is an integer higher than zero;
the index "z" can be zero or an integer ranging from 1 to 20; and
the sum (x+y) is equal to or higher than 2.

32. The process according to claim 30, wherein said α-olefin is (co)polymerized in either continuous or batchwise, in one or more steps, in reactors, at low (0.1–1.0 MPa), medium (1.0–10 MPa) or high (10–150 MPa) pressure, at temperatures between 20 and 240° C., optionally in the presence of an inert diluent.

33. The process according to claim 30, wherein it is carried out in solution or suspension, in an inert medium consisting of an aliphatic or cycloaliphatic hydrocarbon having from 3 to 15 carbon atoms, or a mixture thereof.

34. The process according to claim 30, wherein said α-olefin is polymerized in gas phase, at pressures ranging from 0.5 to 5 MPa and temperatures ranging from 50 to 150° C., and said catalytic composition comprises at least one of the components (i) or (ii) on an inert solid carrier.

35. The process according to any claim 30, wherein the at least one α-olefin comprises ethylene.

36. The process according to claim 35, wherein ethylene is copolymerized with at least a second α-olefin having from 3 to 10 carbon atoms.

37. The process according to claim 36, wherein, in addition to said second α-olefin, a non-conjugated, aliphatic or alicyclic diene, having from 5 to 20 carbon atoms is copolymerized with ethylene.

38. The process according to claim 30, wherein said catalytic composition is prepared separately and subsequently put in contact with said at least one α-olefin.

39. The process according to claim 30, wherein said catalytic composition is prepared by putting said components (i) and (ii) in contact with each other, directly in the polymerization medium.

40. The process according to claim 30, wherein linear high, medium or low density polyethylene is produced by said (co)polymerization.

41. A catalytic composition for the (co) polymerization of ethylene and other α-olefins, comprising the following two components in contact with each other, or the product of their reaction:

(i) a metallocene complex of a metal M of group 4 of the periodic table, including at least one η⁵-cyclopentadienyl group and at least one unsaturated hydrocarbyl group R', bonded to the metal M;

(ii) an ionizing activator which is at least one organic or organometallic compound capable of reacting with said metallocene complex (i) so as to form a positive ionic charge thereon by the ex-traction of an anion of an unsaturated hydrocarbylic organic group and formation of a non-coordinating anion with a delocalized ionic charge, selected from the group consisting of the following classes of compounds:

I) non-coordinating ionic organometallic compounds;

II) non-coordinating Lewis acids, and

III) polyfluorinated cyclopentadienyl compounds, wherein said unsaturated hydrocarbyl group R' has the following formula (I):

-($A_xD_yU_z$) $R^I$    (I)

wherein:

A represents any monomeric unit derived from a vinylaromatic group polymerizable by means of anionic polymerization, having from 6 to 20 carbon atoms;

D represents any monomeric unit derived from a conjugated diolefin polymerizable by means of anionic polymerization, having from 4 to 20 carbon atoms;

U represents any generic monomeric unit derived from an unsaturated compound copolymerizable with any of the above conjugated diolefins D or vinylaromatic compounds A;

$R^I$ represents hydrogen or a hydrocarbyl group having from 1 to 20 carbon atoms, each index "x" and "y" can be independently zero or an integer, provided the sum (x+y) is equal to or higher than 2;

the index "z" can be zero or an integer ranging from 1 to 20.

42. The catalytic composition according to claim 5, wherein M is titanium or zirconium.

43. The catalytic composition according to claim 15, wherein said group $R^I$ is selected from the group consisting of tert-butyl, isopropyl, n-hexyl, cyclohexyl, benzyl, phenyl and toluyl.

44. The catalytic composition according to claim 16, wherein groups R' and R" have essentially the same formula.

45. The catalytic composition according to claim 22, wherein $R_7$ is methyl.

46. The catalytic composition according to claim 23, wherein M' is boron.

47. The catalytic composition according to claim 24, wherein each $R_D$ group independently represents a totally fluorinated aryl radical having from 6 to 20 carbon atoms.

48. The catalytic composition according to claim 25, wherein the strong Lewis acid is a triaryl borane.

49. The catalytic composition according to claim 26, wherein at least four of the $R_8$, $R_9$, $R_{10}$, $R_{11}$, $R_{12}$, and $R_{13}$ groups are independently selected from the group (a).

50. The catalytic composition according to claim 28, wherein at least four of said $R_{14}$, $R_{15}$ and $R_{16}$ groups are independently selected from the group (b).

51. The catalytic composition according to claim 27, wherein said fluorinated organic compound having formula (VII) in said activator (ii), is added to the catalytic composition in a molar ratio between 1 and 10, with respect to the moles of the metallocene complex (i).

52. The catalytic composition according to claim 28, wherein said fluorinated organic compound having formula (VIII) in said activator (ii), is added to the catalytic composition in a molar ratio between 1 and 10, with respect to the moles of the metallocene complex (i).

* * * * *